United States Patent
Lin et al.

(10) Patent No.: US 11,845,225 B2
(45) Date of Patent: Dec. 19, 2023

(54) MULTI-MATERIAL STEREOLITHOGRAPHIC THREE DIMENSIONAL PRINTING

(71) Applicant: Holo, Inc., Newark, CA (US)

(72) Inventors: Pierre Pascal Anatole Lin, San Francisco, CA (US); Brian James Adzima, Hayward, CA (US); Arian Aziz Aghababaie, San Francisco, CA (US); Andreas Linas Bastian, Berkeley, CA (US); John Vericella, Oakland, CA (US); Jonathan Pomeroy, San Francisco, CA (US)

(73) Assignee: Holo, Inc., Newark, CA (US)

( * ) Notice: Subject to any disclaimer, the term of this patent is extended or adjusted under 35 U.S.C. 154(b) by 0 days.

(21) Appl. No.: 17/470,648

(22) Filed: Sep. 9, 2021

(65) Prior Publication Data

US 2022/0242043 A1     Aug. 4, 2022

Related U.S. Application Data

(63) Continuation of application No. 15/374,734, filed on Dec. 9, 2016, now Pat. No. 11,141,919.
(Continued)

(51) Int. Cl.
*B29C 64/124* (2017.01)
*B29C 64/35* (2017.01)
(Continued)

(52) U.S. Cl.
CPC ............ *B29C 64/35* (2017.08); *B29C 64/129* (2017.08); *B29C 64/236* (2017.08);
(Continued)

(58) Field of Classification Search
CPC ... B29C 64/106; B29C 64/112; B29C 64/188; B29C 64/35
See application file for complete search history.

(56) References Cited

U.S. PATENT DOCUMENTS

| | | |
|---|---|---|
| 4,252,887 A | 2/1981 | Dessauer |
| 4,269,933 A | 5/1981 | Pazos |

(Continued)

FOREIGN PATENT DOCUMENTS

| | | |
|---|---|---|
| CN | 105122135 A | 12/2015 |
| CN | 105924571 A | 9/2016 |

(Continued)

OTHER PUBLICATIONS

EP18801929.3 Extended European Search Report dated Feb. 17, 2021.
(Continued)

*Primary Examiner* — Joseph S Del Sole
*Assistant Examiner* — Margaret B Hayes
(74) *Attorney, Agent, or Firm* — Wilson Sonsini Goodrich & Rosati

(57) ABSTRACT

Methods, systems, and apparatus, including a method of multi-material stereolithographic three dimensional printing comprising, depositing a first material through a first material dispenser of a stereolithographic three dimensional printer onto an optical exposure window to form a first material layer; curing the first material layer to form a first material structure on a build head of the stereolithographic three dimensional printer; depositing a second material through the first material dispenser or a second material dispenser onto the optical exposure window to form a second material layer; and curing the second material layer to form a second material structure on the build head.

20 Claims, 9 Drawing Sheets

Related U.S. Application Data

(60) Provisional application No. 62/265,380, filed on Dec. 9, 2015.

(51) Int. Cl.
  *B33Y 10/00* (2015.01)
  *B29C 64/336* (2017.01)
  *B29C 64/129* (2017.01)
  *B29C 64/236* (2017.01)
  *B33Y 40/00* (2020.01)
  *B33Y 30/00* (2015.01)

(52) U.S. Cl.
  CPC ............ *B29C 64/336* (2017.08); *B33Y 10/00* (2014.12); *B33Y 40/00* (2014.12); *B33Y 30/00* (2014.12)

(56) References Cited

U.S. PATENT DOCUMENTS

| | | |
|---|---|---|
| 4,801,477 A | 1/1989 | Fudim |
| 4,814,370 A | 3/1989 | Kramer et al. |
| 4,961,154 A | 10/1990 | Pomerantz et al. |
| 5,006,364 A | 4/1991 | Fan |
| 5,096,530 A | 3/1992 | Cohen |
| 5,137,662 A | 8/1992 | Hull et al. |
| 5,143,668 A | 9/1992 | Hida et al. |
| 5,182,056 A | 1/1993 | Spence et al. |
| 5,184,307 A | 2/1993 | Hull et al. |
| 5,236,326 A | 8/1993 | Grossa |
| 5,248,456 A | 9/1993 | Evans, Jr. et al. |
| 5,330,701 A | 7/1994 | Shaw et al. |
| 5,474,719 A | 12/1995 | Fan et al. |
| 5,510,162 A | 4/1996 | Brown |
| 5,531,958 A | 7/1996 | Krueger |
| 5,545,367 A | 8/1996 | Bae et al. |
| 5,656,297 A | 8/1997 | Bernstein et al. |
| 5,676,745 A | 10/1997 | Kelly et al. |
| 5,877,270 A | 3/1999 | Takayama et al. |
| 5,902,537 A | 5/1999 | Almquist et al. |
| 5,922,507 A | 7/1999 | Van et al. |
| 5,998,496 A | 12/1999 | Hassoon et al. |
| 6,090,865 A | 7/2000 | Dudman et al. |
| 6,093,761 A | 7/2000 | Schofalvi et al. |
| 6,100,007 A | 8/2000 | Pang et al. |
| 6,204,316 B1 | 3/2001 | Schofalvi et al. |
| 6,259,962 B1 | 7/2001 | Gothait |
| 6,376,585 B1 | 4/2002 | Schofalvi et al. |
| 6,399,010 B1 | 6/2002 | Guertin et al. |
| 6,658,314 B1 | 12/2003 | Gothait |
| 6,664,354 B2 | 12/2003 | Savu et al. |
| 6,780,472 B2 | 8/2004 | Hamrock et al. |
| 6,833,043 B1 | 12/2004 | Parsonage et al. |
| 6,846,862 B2 | 1/2005 | Schofalvi et al. |
| 6,850,334 B1 | 2/2005 | Gothait |
| 6,852,781 B2 | 2/2005 | Savu et al. |
| 7,022,410 B2 | 4/2006 | Tonapi et al. |
| 7,079,915 B2 | 7/2006 | Huang et al. |
| 7,101,618 B2 | 9/2006 | Coggio et al. |
| 7,173,778 B2 | 2/2007 | Jing et al. |
| 7,195,472 B2 | 3/2007 | John |
| 7,209,797 B2 | 4/2007 | Kritchman et al. |
| 7,223,826 B2 | 5/2007 | Ali et al. |
| 7,267,850 B2 | 9/2007 | Coggio et al. |
| 7,288,469 B2 | 10/2007 | Sharma et al. |
| 7,288,514 B2 | 10/2007 | Scheuing et al. |
| 7,332,217 B2 | 2/2008 | Coggio et al. |
| 7,417,099 B2 | 8/2008 | Savu et al. |
| 7,433,627 B2 | 10/2008 | German et al. |
| 7,438,846 B2 | 10/2008 | John |
| 7,491,441 B2 | 2/2009 | Pokorny et al. |
| 7,511,008 B2 | 3/2009 | Scheuing et al. |
| 7,575,847 B2 | 8/2009 | Jing et al. |
| 7,632,560 B2 | 12/2009 | Filippini et al. |
| 7,662,896 B2 | 2/2010 | Savu et al. |
| 7,718,264 B2 | 5/2010 | Klun et al. |
| 7,845,930 B2 | 12/2010 | Shkolnik et al. |
| 7,907,878 B2 | 3/2011 | Takagi et al. |
| 7,912,411 B2 | 3/2011 | Takagi et al. |
| 7,961,154 B2 | 6/2011 | Qi et al. |
| 8,110,135 B2 | 2/2012 | El-Siblani |
| 8,133,551 B2 | 3/2012 | Claes |
| 8,147,966 B2 | 4/2012 | Klun et al. |
| 8,372,330 B2 | 2/2013 | El-Siblani et al. |
| 8,372,913 B2 | 2/2013 | Claes |
| 8,394,313 B2 | 3/2013 | Shkolnik et al. |
| 8,476,398 B2 | 7/2013 | Klun et al. |
| 8,551,285 B2 | 10/2013 | Ho et al. |
| 8,623,264 B2 | 1/2014 | Rohner et al. |
| 8,696,971 B2 | 4/2014 | Boot et al. |
| 8,716,377 B2 | 5/2014 | Taden et al. |
| 8,729,211 B2 | 5/2014 | Klun et al. |
| 8,734,715 B2 | 5/2014 | Miller et al. |
| 8,741,203 B2 | 6/2014 | Liska et al. |
| 8,753,464 B2 | 6/2014 | Khanna |
| 8,753,714 B2 | 6/2014 | Cheung et al. |
| 8,801,418 B2 | 8/2014 | El-Siblani et al. |
| 8,829,070 B2 | 9/2014 | Morita et al. |
| 8,859,642 B2 | 10/2014 | Miyamoto |
| 8,916,335 B2 | 12/2014 | Kitano et al. |
| 9,108,358 B1 | 8/2015 | Herloski et al. |
| 9,120,270 B2 | 9/2015 | Chen et al. |
| 9,126,446 B1 | 9/2015 | Bonino |
| 9,205,601 B2 | 12/2015 | DeSimone et al. |
| 9,211,678 B2 | 12/2015 | DeSimone et al. |
| 9,216,546 B2 | 12/2015 | DeSimone et al. |
| 9,306,218 B2 | 4/2016 | Pyun et al. |
| 9,360,757 B2 | 6/2016 | DeSimone et al. |
| 9,367,049 B2 | 6/2016 | Jariwala et al. |
| 9,415,418 B2 | 8/2016 | Sreenivasan et al. |
| 9,452,567 B2 | 9/2016 | Syao et al. |
| 9,453,142 B2 | 9/2016 | Rolland et al. |
| 9,486,944 B2 | 11/2016 | El-Siblani et al. |
| 9,492,969 B2 | 11/2016 | Spadaccini et al. |
| 9,498,920 B2 | 11/2016 | DeSimone et al. |
| 9,527,244 B2 | 12/2016 | El-Siblani et al. |
| 9,533,450 B2 | 1/2017 | El-Siblani et al. |
| 9,561,623 B2 | 2/2017 | El-Siblani et al. |
| 9,567,439 B1 | 2/2017 | Pyun et al. |
| 9,598,606 B2 | 3/2017 | Rolland et al. |
| 9,676,963 B2 | 6/2017 | Rolland et al. |
| 9,718,096 B2 | 8/2017 | Sreenivasan et al. |
| 9,782,934 B2 | 10/2017 | Willis et al. |
| 9,796,138 B2 | 10/2017 | Liska et al. |
| 9,833,839 B2 | 12/2017 | Gibson et al. |
| 9,975,295 B2 | 5/2018 | Rolland et al. |
| 9,975,296 B2 | 5/2018 | El-Siblani et al. |
| 9,982,164 B2 | 5/2018 | Rolland et al. |
| 9,987,653 B2 | 6/2018 | Sreenivasan et al. |
| 9,987,804 B2 | 6/2018 | El-Siblani et al. |
| 9,993,974 B2 | 6/2018 | DeSimone et al. |
| 10,011,076 B2 | 7/2018 | El-Siblani et al. |
| 10,016,938 B2 | 7/2018 | DeSimone et al. |
| 10,072,921 B2 | 9/2018 | Fu et al. |
| 10,073,424 B2 | 9/2018 | Lin et al. |
| 10,150,280 B2 | 12/2018 | Aghababaie et al. |
| 10,166,725 B2 | 1/2019 | Willis et al. |
| 10,213,956 B2 | 2/2019 | Willis et al. |
| 10,245,785 B2 | 4/2019 | Adzima |
| 10,354,445 B2 | 7/2019 | Greene et al. |
| 10,421,233 B2 | 9/2019 | Lin et al. |
| 10,464,259 B2 | 11/2019 | Lin et al. |
| 10,882,251 B2 | 1/2021 | Lin et al. |
| 10,935,891 B2 | 3/2021 | Lin et al. |
| 11,141,919 B2 | 10/2021 | Lin et al. |
| 11,161,301 B2 | 11/2021 | Lin et al. |
| 11,351,735 B2 | 6/2022 | Greene et al. |
| 11,400,650 B2 | 8/2022 | Adzima |
| 2001/0035597 A1 | 11/2001 | Grigg et al. |
| 2003/0043360 A1 | 3/2003 | Farnworth |
| 2003/0114936 A1 | 6/2003 | Sherwood et al. |
| 2004/0138049 A1 | 7/2004 | Yasrebi et al. |
| 2004/0187714 A1 | 9/2004 | Napadensky et al. |
| 2006/0054039 A1 | 3/2006 | Kritchman et al. |

(56) References Cited

U.S. PATENT DOCUMENTS

| | | |
|---|---|---|
| 2006/0127153 A1* | 6/2006 | Menchik .............. G01G 17/06 400/62 |
| 2006/0163774 A1 | 7/2006 | Abels et al. |
| 2006/0257785 A1 | 11/2006 | Johnson |
| 2007/0264481 A1 | 11/2007 | DeSimone et al. |
| 2008/0169586 A1 | 7/2008 | Hull et al. |
| 2008/0181977 A1 | 7/2008 | Sperry et al. |
| 2008/0252682 A1 | 10/2008 | Hernandez et al. |
| 2009/0020901 A1 | 1/2009 | Schillen et al. |
| 2009/0130449 A1 | 5/2009 | El-Siblani |
| 2009/0196946 A1 | 8/2009 | Kihara et al. |
| 2009/0304952 A1* | 12/2009 | Kritchman ............ B33Y 10/00 427/256 |
| 2010/0028994 A1 | 2/2010 | DeSimone et al. |
| 2010/0029801 A1 | 2/2010 | Moszner et al. |
| 2010/0122634 A1 | 5/2010 | Doyle |
| 2010/0125356 A1 | 5/2010 | Shkolnik et al. |
| 2010/0173096 A1 | 7/2010 | Kritchman et al. |
| 2011/0089610 A1 | 4/2011 | El-Siblani et al. |
| 2011/0181941 A1 | 7/2011 | Henningsen |
| 2011/0182805 A1 | 7/2011 | DeSimone et al. |
| 2011/0287185 A1 | 11/2011 | Felstead et al. |
| 2011/0310370 A1 | 12/2011 | Rohner et al. |
| 2011/0318595 A1 | 12/2011 | Breiner et al. |
| 2012/0046376 A1 | 2/2012 | Loccufier et al. |
| 2012/0107625 A1 | 5/2012 | Smith et al. |
| 2012/0195994 A1 | 8/2012 | El-Siblani et al. |
| 2013/0000553 A1 | 1/2013 | Hoechsmann et al. |
| 2013/0001834 A1 | 1/2013 | El-Siblani et al. |
| 2013/0056910 A1 | 3/2013 | Houbertz-Krauss et al. |
| 2013/0123988 A1 | 5/2013 | Jariwala et al. |
| 2013/0252178 A1 | 9/2013 | McLeod et al. |
| 2013/0336884 A1 | 12/2013 | DeSimone et al. |
| 2014/0084517 A1* | 3/2014 | Sperry ................. B29C 64/245 264/494 |
| 2014/0265032 A1* | 9/2014 | Teicher ................ B29C 64/112 264/401 |
| 2014/0339741 A1 | 11/2014 | Aghababaie et al. |
| 2014/0361463 A1 | 12/2014 | DeSimone et al. |
| 2015/0019000 A1 | 1/2015 | Nakamura |
| 2015/0064298 A1 | 3/2015 | Syao |
| 2015/0072293 A1 | 3/2015 | DeSimone et al. |
| 2015/0077215 A1 | 3/2015 | Ranky et al. |
| 2015/0097315 A1 | 4/2015 | DeSimone et al. |
| 2015/0097316 A1 | 4/2015 | DeSimone et al. |
| 2015/0102532 A1 | 4/2015 | DeSimone et al. |
| 2015/0137426 A1 | 5/2015 | Van et al. |
| 2015/0139608 A1 | 5/2015 | Theobalt et al. |
| 2015/0183168 A1 | 7/2015 | Liverman et al. |
| 2015/0202805 A1 | 7/2015 | Saruhashi et al. |
| 2015/0210007 A1 | 7/2015 | Durand et al. |
| 2015/0224710 A1 | 8/2015 | El-Siblani et al. |
| 2015/0231828 A1 | 8/2015 | El-Siblani et al. |
| 2015/0231831 A1 | 8/2015 | El-Siblani |
| 2015/0273632 A1 | 10/2015 | Chen |
| 2015/0287169 A1 | 10/2015 | Ueda et al. |
| 2015/0290881 A1 | 10/2015 | Ederer et al. |
| 2015/0328839 A1 | 11/2015 | Willis et al. |
| 2015/0331402 A1 | 11/2015 | Lin et al. |
| 2015/0343745 A1 | 12/2015 | Pesek et al. |
| 2015/0344682 A1 | 12/2015 | Ganapathiappan et al. |
| 2015/0360419 A1 | 12/2015 | Willis et al. |
| 2016/0023403 A1 | 1/2016 | Ramos et al. |
| 2016/0023467 A1 | 1/2016 | Din et al. |
| 2016/0046075 A1 | 2/2016 | DeSimone et al. |
| 2016/0059484 A1 | 3/2016 | DeSimone et al. |
| 2016/0059486 A1 | 3/2016 | Desimone et al. |
| 2016/0059487 A1 | 3/2016 | DeSimone et al. |
| 2016/0067921 A1 | 3/2016 | Willis et al. |
| 2016/0121547 A1 | 5/2016 | Kobayashi |
| 2016/0122539 A1 | 5/2016 | Okamoto et al. |
| 2016/0131974 A1 | 5/2016 | Abe et al. |
| 2016/0136889 A1 | 5/2016 | Rolland et al. |
| 2016/0141535 A1 | 5/2016 | Snaith et al. |
| 2016/0158889 A1 | 6/2016 | Carter et al. |
| 2016/0160077 A1 | 6/2016 | Rolland et al. |
| 2016/0164031 A1 | 6/2016 | Pieper et al. |
| 2016/0167301 A1 | 6/2016 | Cole et al. |
| 2016/0170218 A1 | 6/2016 | Johnson et al. |
| 2016/0193786 A1 | 7/2016 | Moore et al. |
| 2016/0200052 A1 | 7/2016 | Moore et al. |
| 2016/0214321 A1 | 7/2016 | Tow et al. |
| 2016/0271870 A1 | 9/2016 | Brown, Jr. |
| 2016/0271875 A1 | 9/2016 | Brown, Jr. |
| 2016/0303793 A1 | 10/2016 | Ermoshkin et al. |
| 2016/0303795 A1 | 10/2016 | Liu et al. |
| 2016/0325493 A1 | 11/2016 | DeSimone et al. |
| 2016/0332366 A1 | 11/2016 | Donovan |
| 2016/0332386 A1 | 11/2016 | Kuijpers |
| 2016/0368054 A1 | 12/2016 | Ng et al. |
| 2016/0368210 A1 | 12/2016 | Chen et al. |
| 2016/0368221 A1 | 12/2016 | Ueda et al. |
| 2017/0015058 A1 | 1/2017 | Ueda et al. |
| 2017/0021562 A1 | 1/2017 | El-Siblani et al. |
| 2017/0022312 A1 | 1/2017 | Liu et al. |
| 2017/0028644 A1 | 2/2017 | Evans et al. |
| 2017/0080641 A1 | 3/2017 | El-Siblani |
| 2017/0087765 A1 | 3/2017 | Rundlett et al. |
| 2017/0087769 A1 | 3/2017 | Lancaster-Larocque et al. |
| 2017/0106399 A1 | 4/2017 | Sreenivasan et al. |
| 2017/0106603 A1 | 4/2017 | Pobihun |
| 2017/0113406 A1 | 4/2017 | Chen et al. |
| 2017/0113416 A1 | 4/2017 | DeSimone et al. |
| 2017/0120326 A1 | 5/2017 | Heikkila et al. |
| 2017/0120515 A1 | 5/2017 | Rolland et al. |
| 2017/0151718 A1 | 6/2017 | Rolland et al. |
| 2017/0173881 A1 | 6/2017 | Dachs, II et al. |
| 2017/0182708 A1 | 6/2017 | Lin et al. |
| 2017/0210077 A1 | 7/2017 | Ermoshkin et al. |
| 2017/0239887 A1 | 8/2017 | Rolland et al. |
| 2017/0246660 A1 | 8/2017 | Thompson et al. |
| 2017/0246804 A1 | 8/2017 | El-Siblani et al. |
| 2017/0266876 A1* | 9/2017 | Hocker ................ B29C 64/106 |
| 2017/0291356 A1 | 10/2017 | Adachi et al. |
| 2017/0297099 A1 | 10/2017 | Gibson et al. |
| 2017/0334129 A1 | 11/2017 | Ebert et al. |
| 2017/0342182 A1 | 11/2017 | Pesek et al. |
| 2017/0369633 A1 | 12/2017 | Caruso et al. |
| 2018/0001552 A1 | 1/2018 | Dachs, II et al. |
| 2018/0001581 A1 | 1/2018 | Patel et al. |
| 2018/0015669 A1 | 1/2018 | Moore et al. |
| 2018/0044448 A1 | 2/2018 | Moser et al. |
| 2018/0071977 A1 | 3/2018 | Tumbleston et al. |
| 2018/0079865 A1 | 3/2018 | Pyun et al. |
| 2018/0100037 A1 | 4/2018 | Pyun |
| 2018/0105649 A1 | 4/2018 | Pyun et al. |
| 2018/0126630 A1 | 5/2018 | Panzer et al. |
| 2018/0126631 A1 | 5/2018 | Nauka et al. |
| 2018/0133959 A1 | 5/2018 | Moore et al. |
| 2018/0162047 A1 | 6/2018 | Gibson et al. |
| 2018/0162048 A1 | 6/2018 | Gibson et al. |
| 2018/0194066 A1 | 7/2018 | Ramos et al. |
| 2018/0200948 A1 | 7/2018 | Kuijpers et al. |
| 2018/0208686 A1 | 7/2018 | Pyun et al. |
| 2018/0264724 A1 | 9/2018 | Feller et al. |
| 2018/0333912 A1* | 11/2018 | Lin ...................... B29C 64/165 |
| 2018/0333913 A1 | 11/2018 | Lin et al. |
| 2018/0348646 A1 | 12/2018 | Lin et al. |
| 2018/0361666 A1 | 12/2018 | Adzima |
| 2019/0023917 A1 | 1/2019 | Drazba et al. |
| 2019/0126533 A1* | 5/2019 | Thompson ............ B33Y 10/00 |
| 2019/0134886 A1 | 5/2019 | Willis et al. |
| 2019/0134899 A1 | 5/2019 | Mueller et al. |
| 2019/0176398 A1 | 6/2019 | Adzima |
| 2019/0210285 A1 | 7/2019 | Tomioka et al. |
| 2019/0212572 A1 | 7/2019 | Tomioka |
| 2019/0224918 A1 | 7/2019 | Zheng |
| 2019/0224919 A1 | 7/2019 | Houben et al. |
| 2019/0291342 A1 | 9/2019 | Chen et al. |
| 2019/0299283 A1 | 10/2019 | Sheinman |
| 2019/0322033 A1 | 10/2019 | Willis et al. |
| 2020/0031044 A1 | 1/2020 | Lin et al. |
| 2020/0172748 A1 | 6/2020 | Moussa |
| 2020/0316865 A1 | 10/2020 | Adzima |

(56) References Cited

U.S. PATENT DOCUMENTS

| | | | |
|---|---|---|---|
| 2020/0362157 | A1 | 11/2020 | Parkar et al. |
| 2021/0171701 | A1 | 6/2021 | Klun et al. |
| 2021/0186820 | A1 | 6/2021 | Chakraborty et al. |
| 2021/0238328 | A1 | 8/2021 | Wu et al. |
| 2021/0361389 | A1 | 11/2021 | Mac Murray et al. |
| 2022/0176622 | A1 | 6/2022 | Lin et al. |
| 2023/0082164 | A1 | 3/2023 | Greene et al. |

FOREIGN PATENT DOCUMENTS

| | | |
|---|---|---|
| CN | 107573058 A | 1/2018 |
| CN | 110914058 A | 3/2020 |
| JP | 2015229349 A | 12/2015 |
| WO | WO-2018125596 A1 | 7/2018 |
| WO | WO-2019104072 A1 | 5/2019 |
| WO | WO-2020139858 A1 | 7/2020 |
| WO | WO-2020149831 A1 | 7/2020 |
| WO | WO-2022225854 A1 | 10/2022 |

OTHER PUBLICATIONS

Essemtec AG. Essemtec—Spider—Compact High Speed Jetter and Dispenser. YouTube Web Video. Published on Jul. 5, 2016. 2 pages. URL https://www.youtube.com/watch?v=NpgBurid2wU.

Essemtec AG. Essemtec Scorpion—Versatile High Speed Jetting of Solder Paste and Glue. YouTube Web Video. Published on Nov. 13, 2014. 2 pages. URL https://www.youtube.com/watch?v=SZ-Kq2Gkm5Y.

Fairbanks, et al. Photoinitiated polymerization of PEG-diacrylate with lithium phenyl-2,4,6-trimethylbenzoylphosphinate: polymerization rate and cytocompatibility. Biomaterials, 30 (2009): 6702-6707.

"Final Office action dated Jan. 7, 2019 for U.S. Appl. No. 14/967,055".

"Flexography." Wikipedia, Wikimedia Foundation, May 23, 2018, en.wikipedia.org/wiki/Flexography.

GB1809886.3 Office Action dated May 16, 2019.

German, et al. Injection Molding of Metals and Ceramics. Metal Powder Industries Federation, 1997.

Gonsalvi, et al. Novel synthetic pathways for bis(acyl)phosphine oxide photoinitiators. Angew. Chern. Int. Ed., 51 (2012): 7895-7897.

Green, Industrial photoinitiators-a technical guide, CRC Press,@ 2010 Taylor and Francis Group, LLC, 191 pages.

Houben. Equipment for printing of high viscosity liquids and molten metals. Universiteit Twente. Sep. 27, 2012.

Ikemura, et al. Design of a new dental adhesive-effect of a water-soluble sodium acyl phosphine oxide with crown ether on adhesion to dental hard tissues. Dental Materials Journal, 28.3 (2009): 267-276.

Kloxin, et al. Photodegradable hydro gels for dynamic tuning of physical and chemical properties. Science, 324 (2009): 59-63.

Kyzen. Stencil Cleaning & Misprinted PCB Cleaners. 2018. http://www.kyzen.com/electronics-manufacturing-cleaning/stencils-and-misprints/.

Lambert, et al. Design considerations for mask projection microstereolithography systems. (Jun. 22, 2016) [online] (retrieved from https://sffsymposium.engr.utexas.edu/Manuscripts/2013/2013-09-Lambert.pdf), 20 pages.

Lee, et al. Solvent Compatibility of Poly(dimethylsiloxane)-Based Microfluidic Devices, Anal. Chem. 75 (2003): 6544-6554.

Massey, L. Permeability Properties of Plastics and Elastomers—A Guide to Packaging and Barrier Materials. Published Jan. 1, 2003. pp. 1-5, 19-29.

Matyjaszewski, et al. Atom transfer radical polymerization. Chern. Rev., 101 (2001): 2921-2990.

McDonald, et al. Fabrication of microfluidic systems in poly(dimethylsiloxane). Electrophoresis, 21(2000): 27-40.

Miller. Slot Die Coating Technology. Aug. 3, 2009.

Moad, et al. Living radical polymerization by the RAFT process. Aust. J. Chern., 58 (2005): 379-410.

Murata, et al. Photopolymerization-induced phase separation in binary blends of photocurable/linear polymers. Polymer. vol. 43, Issue 9, Apr. 2002, pp. 2845-2859.

Myiconnect007. Taiyo's Inkjet Solder Mask Applied with Meyer Burger's PIXDRO IP410 Printer. YouTube Web Video. Published on Feb. 13, 2015. 2 pages. URL https://www.youtube.com/watch?v=jm_JteEkQWE.

Organic photoinitiators, [online] [Retrieved on Aug. 4, 2014]; Retrieved from the Internet URL: htts://www.sigmaaldrich.com/materials-science/material-scienceproducts.html?TablePage=16374997; 1 page.

Otsu, et al. Polymer design by iniferter technique in radical polymerization: synthesis of AB and ABA block copolymers containing random and alternating copolymer sequences. Polymer Journal, 17.1 (1985): 97-104.

Pan, et al. Rapid manufacturing in minutes: the development of a mask projection stereolithography process for high-speed fabrication. Proceedings of the ASME 2012 International Manufacturing Science and Engineering Conferences, Jun. 4-8, 2012, Notre Dame, Indiana, US, 10 pages.

PCT/US2018/032837 International Search Report and Written Opinion dated Sep. 24, 2018.

PCT/US2018/037630 International Search Report and Written Opinion dated Oct. 3, 2018.

PCT/US2019/068413 Search Report & Written Opinion dated Apr. 23, 2020.

Pinnau, et al. Gas and vapor properties of amorphous perfluorinated copolymer membranes based on 2,2-bistrifluoromethyl-4,5-difluoro-1,3-dioxole/tetrafluoroethylene. Journal of Membrane Science, 109: 125-133 (1996).

RAFT agents, [online] [Retrieved on Aug. 4, 2014]; Retrieved from the Internet URL: h !!Q ://www. sigmaaldrich.com/materials-science/material-scienceproducts.html?TablePage=I03936134; 4 pages.

"Reverse Roll Coating." Wikipedia, Wikimedia Foundation, Apr. 10, 2018, en.wikipedia.org/wiki/Reverse_roll_coating.

Scott, et al. Two-color single-photon photoinitiation and photoinhibition for subdiffraction photolithography. Science, 324 (2009): 913-917.

"Screen Printing." Wikipedia, Wikimedia Foundation, May 17, 2018, en.wikipedia.org/wiki/Screen_printing#1960s_to_present.

"Spin Coating." Wikipedia, Wikimedia Foundation, Apr. 10, 2018, en.wikipedia.org/wiki/Spin_coating.

Szczepanski, et al. A new approach to network heterogeneity: Polymerization Induced Phase Separation in photo-initiated, free-radical methacrylic systems. Polymer (Guildf). Sep. 28, 2012;53(21):4694-4701.

Temel, et al. Synthesis of main chain polymeric benzophenone photoinitiator via thiol-ene click chemistry and its use in free radical polymerization. J. Polym. Sci. A: Polym. Chern., 48 (2010): 5306-5312.

Unknown author, "DuPont™ Teflon® AF amorphous fluoroplastic resin," (Jun. 22, 2016) [online] (retrieved from http://www2.dupont.com/Teflon_Industrial/en_US/assets/downloads/h44587.pdf), 4 pages.

Unknown author, "Teflon™ AF amorphous fluoroplastic resins," (Jun. 22, 2016) [online] (retrieved from https://www.chemours.com/Teflon_Industrial/en_us/assets/downloads/teflon-af-product-information.pdf), 3 pages.

U.S. Appl. No. 15/983,962 Notice of Allowance dated Dec. 20, 2018.

U.S. Appl. No. 16/016,253 Notice of Allowance dated Oct. 2, 2020.

U.S. Appl. No. 14/711,703 Notice of Allowance dated Jun. 8, 2017.

U.S. Appl. No. 14/711,703 Office Action dated Apr. 22, 2016.

U.S. Appl. No. 14/711,703 Office Action dated Dec. 1, 2016.

U.S. Appl. No. 14/848,162 Notice of Allowance dated Oct. 3, 2018.

U.S. Appl. No. 14/848,162 Office Action dated Jun. 5, 2018.

U.S. Appl. No. 14/848,162 Office Action dated Sep. 18, 2017.

U.S. Appl. No. 14/967,055 Office Action dated May 19, 2017.

U.S. Appl. No. 14/967,055 Office Action dated Jan. 7, 2019.

U.S. Appl. No. 14/967,055 Office Action dated Jul. 12, 2018.

U.S. Appl. No. 14/967,055 Office Action dated Nov. 1, 2017.

(56) References Cited

OTHER PUBLICATIONS

U.S. Appl. No. 15/919,124 Notice of Allowance dated Nov. 27, 2020.
U.S. Appl. No. 15/919,124 Office Action dated Jun. 25, 2020.
U.S. Appl. No. 15/983,962 Notice of Allowance dated Oct. 12, 2018.
U.S. Appl. No. 16/016,253 Office Action dated Feb. 21, 2019.
U.S. Appl. No. 16/016,253 Office Action dated Oct. 16, 2018.
U.S. Appl. No. 16/016,253 Office Action dated Oct. 21, 2019.
U.S. Appl. No. 16/016,257 Notice of Allowance dated Jul. 17, 2019.
U.S. Appl. No. 16/016,257 Office Action dated Mar. 21, 2019.
U.S. Appl. No. 16/016,257 Office Action dated Sep. 27, 2018.
U.S. Appl. No. 16/016,262 Notice of Allowance dated Jul. 5, 2019.
U.S. Appl. No. 16/016,262 Office Action dated Mar. 21, 2019.
U.S. Appl. No. 16/016,262 Office Action dated Sep. 28, 2018.
U.S. Appl. No. 16/049,288 Notice of Allowance dated Jan. 3, 2019.
U.S. Appl. No. 16/049,288 Office Action dated Oct. 11, 2018.
U.S. Appl. No. 16/202,039 Office Action dated Apr. 15, 2020.
U.S. Appl. No. 16/276,148 Office Action dated May 20, 2019.
U.S. Appl. No. 16/276, 148 Office Action dated Nov. 29, 2019.
U.S. Appl. No. 16/539,333 Office Action dated Jan. 7, 2021.
Varma et al. Solution Combustion Synthesis of Nanoscale Materials. Chem Rev. Dec. 1, 20164;116(23):14493-14586.
Wei, et al. A highly efficient polyurethane-type polymeric photoinitiator containing in-chain benzophenone and coinitiator amine for photopolymerization of PU prepolymers. Macromol. Chern. Phys., 207 (2006): 2321-2328.
Yang, et al. Synthesis of 1,6-hexanediol diacrylate, 2010.
Yang, H. et al. "High Viscosity Jetting System for 3d Reactive Inkjet Printing." (2013).
Zhang, Teflon AF composite materials in membrane separation and molecular recognition in fluorous media. Ph.D. dissertation, University of Pittsburgh, 2013, 207 pages.
Co-pending U.S. Appl. No. 18/078,211, inventors Willis; Karl et al., filed Dec. 9, 2022.
EP18816953.6 European Search Report dated May 18, 2021.
PCT/US2022/025229 International Search Report and Written Opinion dated Aug. 24, 2022.
PCT/US20/33279 International Search Report & Written Opinion dated Oct. 9, 2020.
U.S. Appl. No. 16/202,039 Office Action dated Aug. 27, 2020.
U.S. Appl. No. 16/202,039 Office Action dated Jul. 7, 2022.
U.S. Appl. No. 16/202,039 Office action dated Nov. 1, 2021.
U.S. Appl. No. 16/457,380 Office Action dated Jan. 21, 2022.
U.S. Appl. No. 16/539,333 Notice of Allowance dated Sep. 9, 2021.
U.S. Appl. No. 16/539,333 Office Action dated Jul. 20, 2021.
U.S. Appl. No. 16/842,082 Notice of Allowance dated Apr. 28, 2022.
U.S. Appl. No. 16/842,082 Notice of Allowance dated May 24, 2022.
U.S. Appl. No. 16/842,082 Office Action dated Jul. 22, 2021.
U.S. Appl. No. 17/355,394 Notice of Allowance dated Feb. 2, 2022.
U.S. Appl. No. 16/016,253 Notice of Allowance dated Aug. 18, 2020.
U.S. Appl. No. 15/374,734 Notice of Allowance dated Aug. 4, 2021.
U.S. Appl. No. 15/374,734 Office Action dated Feb. 26, 2020.
U.S. Appl. No. 15/374,734 Office Action dated Sep. 4, 2020.
U.S. Appl. No. 15/374,734 Office Action dated Sep. 6, 2019.

\* cited by examiner

MULTI-MATERIAL STEREOLITHOGRAPHIC THREE DIMENSIONAL PRINTING

CROSS-REFERENCE TO RELATED APPLICATION

This application is a continuation of U.S. patent application Ser. No. 15/374,734, filed Dec. 9, 2016, which claims the benefit of U.S. Provisional Patent Application No. 62/265,380, filed Dec. 9, 2015, each of which is incorporated herein by reference.

FIELD

The present invention relates to three dimensional (3D) printing using photosensitive materials and digital light processing (DLP) stereolithographic (SLA) printing.

BACKGROUND

In recent years there has been a large increase in the number and type of 3D printers available to the hobbyist, jewelry makers, and consumers. A certain subsection of these SLA 3D printers use a configuration that requires light to be transmitted from underneath, through a transparent material (called the window), into the resin whereby the resin is cured, usually in thin layers. A few examples of such printers are the FormLabs Form 1+3D printer, the Pegasus Touch Laser 3D Printer by Full Spectrum Laser, the Solidator 3D Printer by Solidator, etc. The resin contains pigments or dyes that absorb (and/or scatter) light at the wavelength used to cure the resin. The window material needs to be transparent, free from optical defects, and inert to the resin especially during the curing of the resin. The most common window material is PDMS (polydimethylsiloxane).

DLP SLA 3D printers typically print in a single material. This limits the application space and also impacts the user experience. Notably it creates a support generation problem. Overhangs of the model need to be supported during the 3D printing process. When only one print material is available, the support material and part material are the same and therefore have the same material properties. This has two impacts: first, removing the supports becomes a challenge and there is a high risk of damaging the printed part or leaving undesirable marks on the surface of the printed part; and second, because of the first issue, when generating support you want to minimize the number of supports used. This represents a significant challenge that is difficult to solve through software algorithms.

Moreover, systems that use multi-materials in bottom-up DLP SLA use multiple resin trays, with each resin tray containing a different material. In addition, there is often a cleaning and drying station to prevent contamination between the different materials in the different resin trays. The cleaning and drying between the use of different materials, however, is performed separately and therefore significantly increases the print time, for example it can take 5-10 times longer to print a part with two materials as it does with one material.

SUMMARY

This specification describes technologies relating to three dimensional (3D) printing using photosensitive materials (e.g., photopolymers) and digital light processing stereolithographic (DLP SLA) printing.

Particular embodiments of the subject matter described in this specification can be implemented to realize one or more of the following advantages. In particular, the embodiments help to reduce support generation as a cause of print failure. Still further, development of support structure(s) can be simplified, enabling 3D printing of a part correctly with less iteration, even for experienced users. In addition, support removal, which is typically a manual process that significantly adds to the touch time required to produce a part using DLP SLA, can be made easier since a support material with different material properties from the main material(s) can be used.

In addition, independent of the building of supports during 3D printing, the ability to readily do DLP SLA printing with more than a single material can provide significant advantages. Many applications require the use of more than one material, e.g., the handle of a device that has rubber over-molded onto a rigid plastic to improve the grip. Using the systems and techniques described herein, the application space for a 3D printer can be increased. More than one material can be used in DLP SLA in a manner that is significantly quicker than existing implementations of multi-material DLP SLA. In addition, the issue of having to ensure that the optical windows of all the resin trays in a multi-resin tray system are co-planar can be avoided, thus reducing the opportunities for distortions in the printed part that can be caused by the optical windows not being coplanar.

Representatively, in one embodiment, the invention is directed to a process of multi-material stereolithographic three dimensional printing. The process may include depositing a first material through a first material dispenser of a stereolithographic three dimensional printer onto an optical exposure window to form a first material layer and curing the first material layer to form a first material structure on a build head of the stereolithographic three dimensional printer. The process may further include depositing a second material through the first material dispenser or a second material dispenser onto the optical exposure window to form a second material layer and curing the second material layer to form a second material structure on the build head. In some embodiments, the first material and the second material may include a photosensitive material, and curing may include positioning the build head over the optical exposure window and emitting a light from a light source positioned below the optical exposure window through the optical exposure window to the first material layer or the second material. In still further embodiments, the process may include performing a cleaning operation prior to depositing the second material layer. The cleaning operation may include moving the build head and the optical exposure window past one or more of a cleaning device to mechanically clean any uncured first material from the build head and the optical exposure window. The process may further include a separation operation after the curing of the first material and a cleaning operation. The separation operation may include separating the build head from the optical exposure window, and the cleaning operation may be performed simultaneously with the separation operation and include cleaning the optical exposure window or the build head of any uncured first material. In addition, the process may include a separation operation and a cleaning operation after the curing of the second material. The separation operation may include separating the build head from the optical exposure window, and the cleaning operation may be performed simultaneously with the separation operation and include cleaning the optical exposure window, the build head or the second material layer of the any uncured second material. In some cases, the second material is deposited through the first material dispenser.

In other embodiments, the invention is directed to a multi-material stereolithographic three dimensional printer including a light source adapted to perform stereolithography, a support member having an optical window, a build head, a material dispenser operable to dispense a photosensitive material on the optical window, and a plurality of cleaning devices operable to clean the optical window and the build head. In some cases, the support member may be the only support member. In some cases, the support member may have only one optical window. The material dispenser may be a syringe pump, a peristaltic pump, an ink-jet head, a roller transfer machine, or a film transfer machine. In addition, the printer may include a second material dispenser. Still further, the plurality of cleaning devices may be mechanically coupled with the printer. In addition, the plurality of cleaning devices may be active or passive cleaning devices. For example, the cleaning devices may include rubber blades, solvents, a brush, or a mechanized brush.

In another embodiment, the invention is directed to a stereolithographic three dimensional printing system including a light source adapted to perform stereolithography, a support member having an optical window, a build head, a material dispenser operable to hold a photosensitive material, a plurality of cleaning devices, and a controller operable to cause the material dispenser to dispense a photosensitive material on the optical window, cause the light source to perform stereolithography on the photosensitive material and cure the photosensitive material to the build head, and cause the plurality of cleaning devices to remove any uncured photosensitive material from the optical window and the build head. In some embodiments, the material dispenser is a first material dispenser and the photosensitive material is a first photosensitive material, and the first material dispenser is operable to hold the first photosensitive material, the system further comprising a second material dispenser operable to hold a second photosensitive material, wherein the second photosensitive material is different than the first photosensitive material. In some embodiments, the controller is operable to cause the second material dispenser to dispense the second photosensitive material, and cause the laser source to perform stereolithography on the second photosensitive material and cure the second photosensitive material to the build head or to the first photosensitive material. In some embodiments, the controller is further operable to, after the photosensitive material is dispensed, cause the build head to be positioned over the optical window, and in contact with the photosensitive material, such that the photosensitive material is cured to the build head. In addition, the controller may be operable to cause the cleaning devices to remove any uncured photosensitive material by causing the build head and the optical window to move past one or more of the plurality of cleaning devices. Still further, the controller may be operable to cause the cleaning devices to remove any uncured photosensitive material during an operation in which the build head is separated from the optical window.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

The embodiments disclosed herein are illustrated by way of example and not by way of limitation in the figures of the accompanying drawings in which like references indicate similar elements. It should be noted that references to "an" or "one" embodiment in this disclosure are not necessarily to the same embodiment, and they mean at least one.

DETAILED DESCRIPTION OF THE INVENTION

In this section we shall explain several preferred embodiments with reference to the appended drawings. Whenever the shapes, relative positions and other aspects of the parts described in the embodiments are not clearly defined, the scope of the embodiments is not limited only to the parts shown, which are meant merely for the purpose of illustration. Also, while numerous details are set forth, it is understood that some embodiments may be practiced without these details. In other instances, well-known structures and techniques have not been shown in detail so as not to obscure the understanding of this description.

The terminology used herein is for the purpose of describing particular embodiments only and is not intended to be limiting of the invention. Spatially relative terms, such as "beneath", "below", "lower", "above", "upper", and the like may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (e.g., rotated 90 degrees or at other orientations) and the spatially relative descriptors used herein interpreted accordingly.

As used herein, the singular forms "a", "an", and "the" are intended to include the plural forms as well, unless the context indicates otherwise. It will be further understood that the terms "comprises" and/or "comprising" specify the presence of stated features, steps, operations, elements, and/or components, but do not preclude the presence or addition of one or more other features, steps, operations, elements, components, and/or groups thereof.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Figure 1:
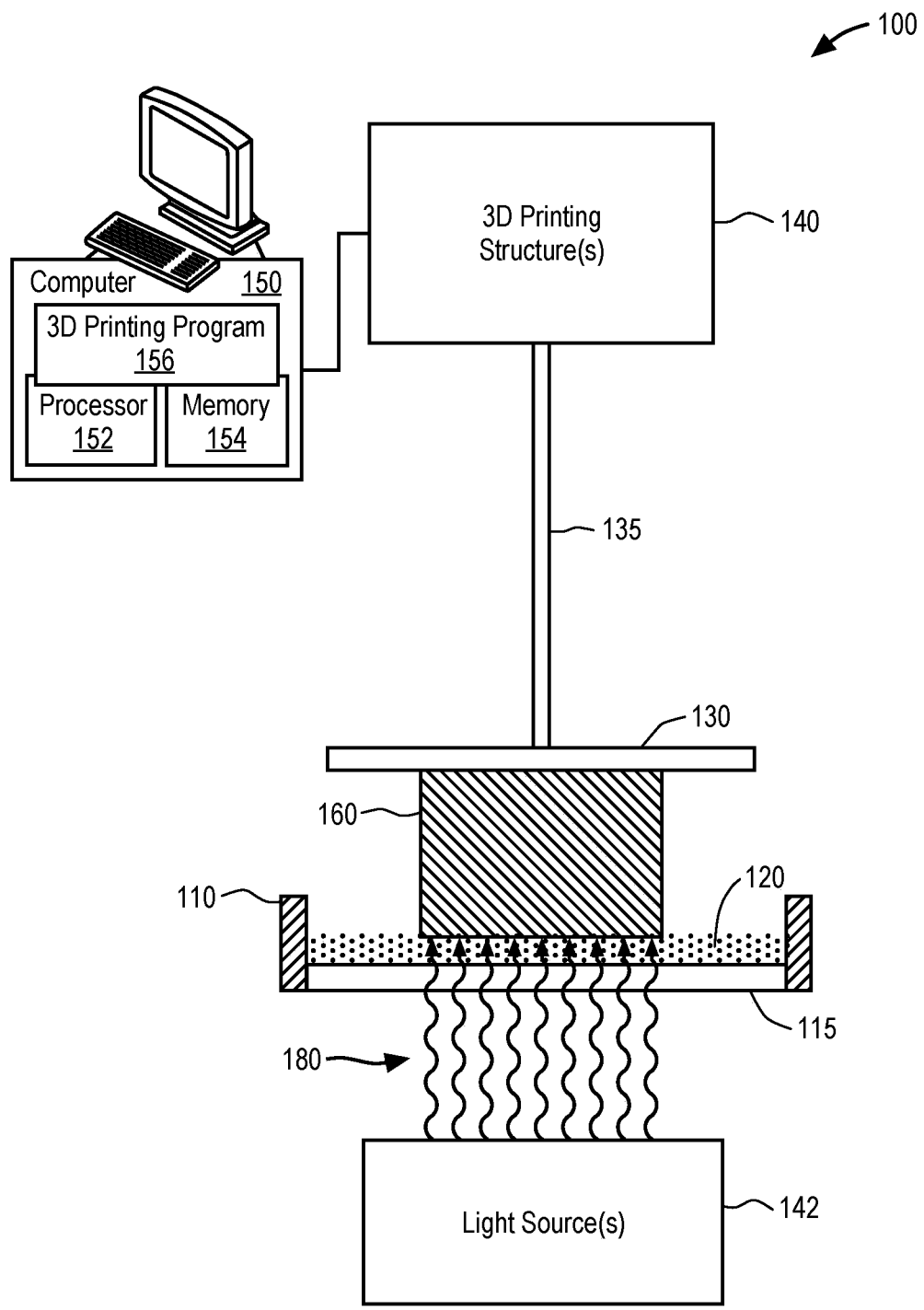
FIG. 1 shows a schematic diagram of one embodiment of a multi-material 3D printing system.

FIG. 1 shows a schematic diagram of one embodiment of a 3D printing system 100. System 100 includes a support tray, reservoir or vat 110 to hold a liquid 120. Liquid 120 may be a layer of material including one or more photosensitive, photoactive, or photoreactive materials or resins. Suitable photosensitive materials or resins may include any photosensitive material having a binding agent (e.g. a polymer), monomer(s) and photoinitiator(s) suitable for generating a 3D printed structure as discussed herein. The bottom portion of vat 110 may include a window 115 through which illumination is transmitted to cure a 3D printed object 160. The 3D printed object 160 is shown as a block, but as will be appreciated, a wide variety of complicated shapes can be 3D printed therefore other shapes and sizes are contemplated.

The 3D printed object 160 is 3D printed on a build plate (or head) 130, which is connected by a rod 135 to one or more 3D printing structures 140. The printing structure(s) 140 are used to move the build plate 130 within vat 110. This movement is relative movement, and thus the moving piece can be the build plate 130, the vat 110, or both, in various implementations. In some implementations, a controller for printing structure(s) 140 is implemented using integrated circuit technology, such as an integrated circuit board with embedded processor and firmware. Such controllers can connect with a computer or computer system. Representatively, in some implementations, system 100 includes a programmed computer 150 that connects to printing structure(s) 140 and operates as the controller for system 100.

Computer 150 may include a processor 152 and a memory 154. Processor 152 can be one or more hardware processors, which can each include multiple processor cores. Memory 154 can include both volatile and non-volatile memory, such as Random Access Memory (RAM) and Flash RAM. Computer 150 can include various types of computer storage media and devices, which can include memory 154, to store instructions of programs that run on the processor 152. For example, a 3D printing program 156 can be stored in the memory 154 and run on processor 152 to implement the techniques described herein. These techniques can include control of 3D printing structures 140 that move build head 130, vat 110 and/or window 115, as well as cleaning devices and/or material dispenser(s), as described in further detail below. In addition, these techniques can include algorithms to develop support structures and/or determine the order of printing of different materials within each respective layer of object 160.

One or more light sources 142 are positioned below the window 115 and are connected with computer 150 (or other controller). For example, light source(s) 142 can be a DLP projector that can output patterned light at different wavelengths. In one embodiment, light source 142 is a laser source adapted to perform stereolithography. Light source(s) 142 may direct at least a first light 180 into liquid 120 through the window 115. The light 180 has a wavelength selected to create 3D structure 160 on build plate 130 by curing the photosensitive resin in the liquid 120, in accordance with a defined pattern or patterns. In addition, the one or more light sources 142 can be a dual wavelength illumination source device or separate illumination devices.

In one embodiment, build plate 130 starts at a position near the bottom of vat 110, and a varying pattern of light 180 is directed through window 115 to create solid structure 160 as build plate 130 is raised out of the vat. In addition, computer 150 (or other controller) can build 3D structure 160 using multiple materials. In some implementations, one or more of the multiple materials are used as support structures of 3D structure 160 during the creation of 3D structure 160. In some implementations, two or more (or all) of the multiple materials are used as final components of 3D structure 160. In addition, a controller (e.g., computer 150) can direct cleaning and material dispensing operations, as described in detail below, in addition to controlling one or more lights 180 from one or more light sources 142. In some implementations, the controller for the 3D printer is implemented using a circuit board with integrated circuitry thereon, including an embedded processor and firmware.

Figure 2:
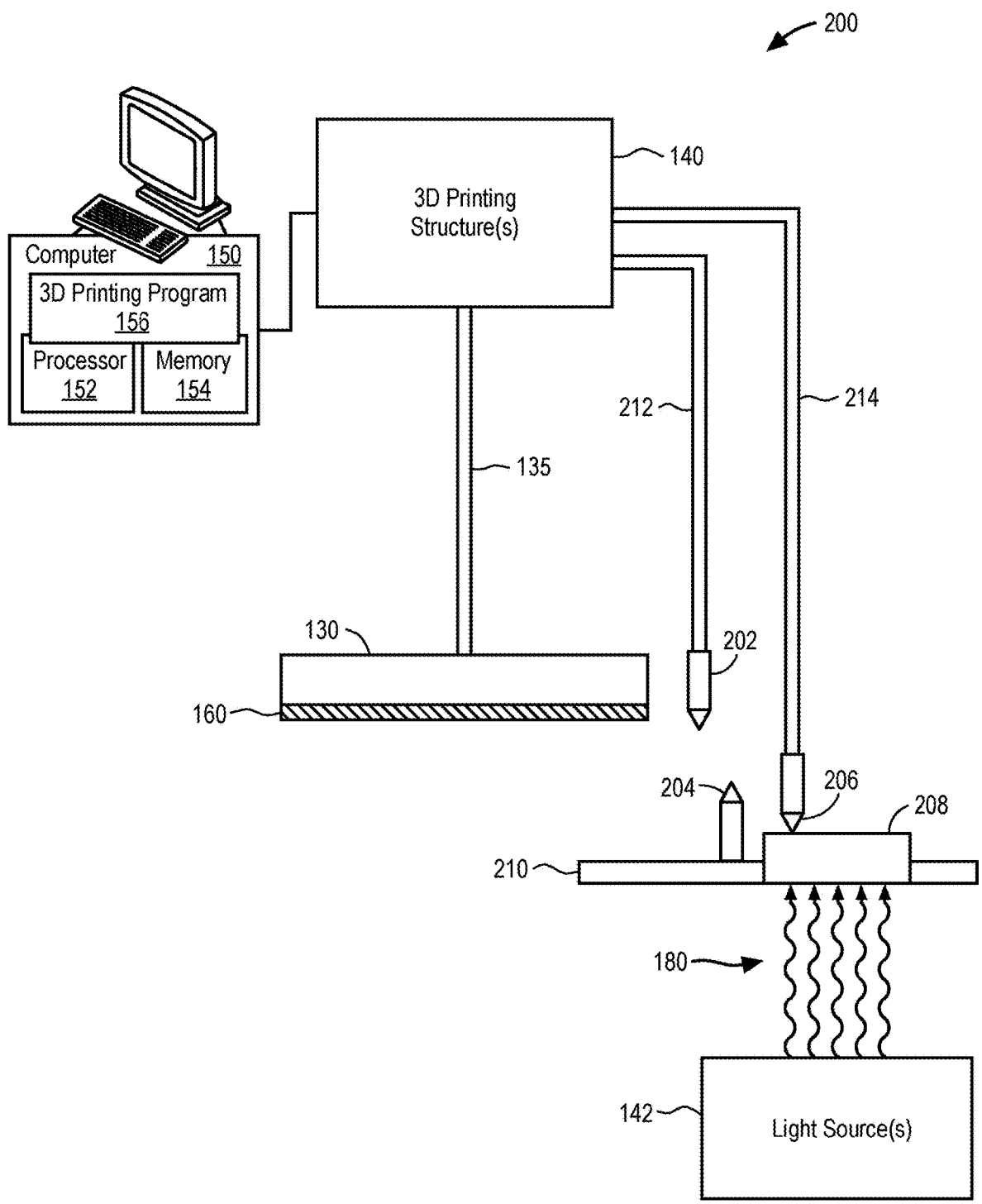
FIG. 2 shows a schematic diagram of one embodiment of a multi-material 3D printing system.

FIG. 2 shows a schematic diagram of one embodiment of a multi-material 3D printing system. 3D printing system 200 shown in FIG. 2 may be substantially the same as system 100 shown in FIG. 1. In FIG. 2, however, various aspects of the printing components are shown in more detail. In particular, from this view it can be seen that system 200 includes a support tray 210 and an optical window 208 through which illumination is transmitted to cure the resin deposited onto optical window 208 to form a 3D printed structure 160. Support tray 210 may be substantially similar to vat 110 shown in FIG. 1 and include sidewalls (not shown) so that it can contain a liquid including a photosensitive resin as previously discussed. The 3D printed object 160 is shown as a block, but as previously discussed, a wide variety of complicated shapes can be 3D printed. The system 200 further includes at least one material dispenser 202 and a plurality of cleaning devices 204 and 206.

The object 160 is 3D printed on a build plate (or head) 130, which is connected by a rod 135 to one or more 3D printing structures 140, which are used to move build plate 130 or support tray 210, as previously discussed. In some implementations, a controller for the printing structure(s) 140 is implemented using integrated circuit technology, such as an integrated circuit board with embedded processor and firmware. Such controllers can connect with a computer or computer system. In some implementations, the system 200 includes a programmed computer 150 that connects to the printing structure(s) 140 and operates as the controller for the system 200.

One or more light sources 142 are positioned below the optical window 208 and are connected with the computer 150 (or other controller). For example, light source(s) 142 can be a DLP projector positioned below optical window 208 and that can output patterned light at different wavelengths. Light source(s) 142 directs at least a first light 180 through the optical window 208. The light 180 has a wavelength selected to create 3D structure 160 on build plate 130 by curing the photosensitive resin applied to optical window 208, in accordance with a defined pattern or patterns. In addition, the one or more light sources 142 can be a dual wavelength illumination source device or separate illumination devices, including laser light sources.

System 200 further includes dispenser 202 and cleaning devices 204, 206. Dispenser 202 and cleaning devices 204, 206 may be part of, or otherwise electrically coupled with, 3D printing structure(s) 140 and computer 150 such that they are controlled, or otherwise operated by, programmed computer 150. For example, dispenser 202 may be mechanically and/or electrically connected to 3D printing structure(s) 140 and computer 150 by support member 212, as shown. Support member 212 may be, for example, a rod through which a printing material can be passed to dispenser 202, and may include wiring running there through to provide an electrical connection between dispenser 202 and computer 150. In addition, cleaning devices 204 and 206 may be mechanically (and in some cases electrically) connected to 3D printing structure(s) 140 by support member 214 (e.g. a rod) and support tray 210, respectively, (e.g. such as by mounting to member 214 and/or support tray 210).

Dispenser 202 may be, for example, any type of dispensing mechanism suitable for dispensing a desired amount of material (for forming printed object 160) onto optical window 208 of support tray 210 in the desired amount. Representatively, dispenser 202 may be a positive pressure pump having valves to control the amount of material dispensed, a deposition extruder, a pick and place type dispenser, a syringe pump, a peristaltic pump, and/or a dispenser such as that found in an ink-jet head. The dispensing equipment may also include a Meyer rod, doctoring blade, or other device to spread the dispensed material across the window surface. The surface of optical window 208 may also be chemically functionalized to ease the spreading of the liquid across the window surface.

Cleaning devices 204 and 206 may be any type of device suitable for cleaning an uncured or undesirable material off of build plate 130 or support tray 210, respectively. For example, cleaning devices 204 and 206 may be passive or active mechanisms suitable for removal of the undesirable material. Representatively, in one embodiment, cleaning devices 204 and 206 are relatively rigid structures which have tip portions that are aligned with the desired surface such that they can mechanically remove (e.g., scrape) any undesirable material off the surface when devices 204, 206, build plate 130 and/or support tray 210 are moved with respect to one another. In addition, in some embodiments, cleaning devices 204 and 206 may include additional features that allow them to first apply a cleaning material to the appropriate surface (e.g. an isopropyl spray) to soften the material and then remove the softened material, such as by suction force. Specific details with respect to the operation of these aspects of printing system 200 will now be described in reference to FIG. 3 to FIG. 12.

Figure 3:
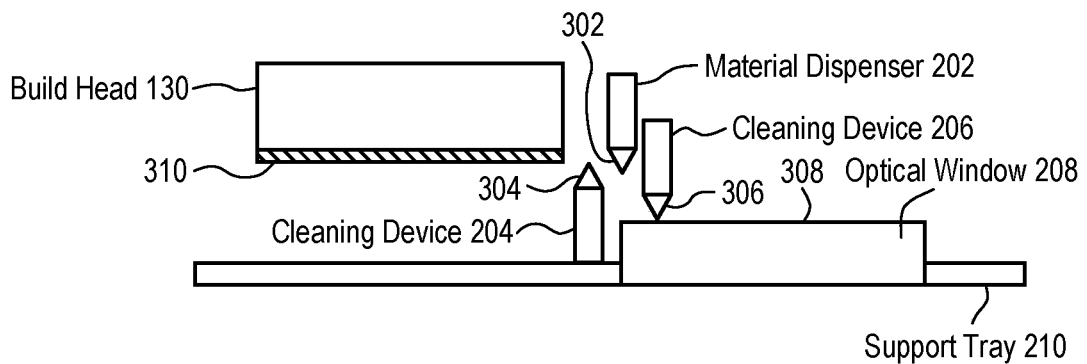
FIG. 3 shows a schematic diagram of the multi-material 3D printing system of FIG. 2 carrying out a printing operation.

FIG. 3 shows a schematic diagram of the multi-material 3D printing system of FIG. 1 and/or FIG. 2 carrying out a printing operation. Representatively, build head 130, support tray 210, optical window 208, a first material dispenser 202, and cleaning devices 204 and 206 of system 200 are shown. The remaining features of system 200 are omitted for ease of illustration, but it should be understood that these features are included and all the operations discussed herein may be automatically performed using, for example, the 3D printing structure, controller and/or computing device previously discussed in reference to FIG. 1 or FIG. 2.

More specifically, FIG. 3 shows a configuration of system 200 prior to applying a print material. In particular, from this view it can be seen that build head 130 is positioned over support tray 210, and slightly offset with respect to window 208, material dispenser 202 and cleaning devices 204, 206. In this aspect, a material surface 308 of optical window 208, upon which a print material can be applied, is exposed to material dispenser 202. In particular, material dispenser 202 is positioned over optical window 208 and oriented such that dispense head 302 faces optical window 208. Cleaning device 204 is mounted to the top side of support tray 210 and is oriented so that a cleaning end 304 faces the build surface 310 of build head 130. In this aspect, cleaning device 204 may be considered a build head cleaning device which is configured to clean build surface 310 of build head 130. Cleaning device 206, on the other hand, is positioned over optical window 208 and is oriented so that a cleaning end 306 faces a material surface 308 of optical window 208. In this aspect, cleaning device 206 may be considered an optical window-cleaning device, which is configured to clean a printing material off of optical window 208. It should be understood that in some embodiments, one or more of dispenser 202, cleaning device 204 and cleaning device 206 may be in a fixed position, while in other embodiments, one or more of these devices may move with respect to one another, build head 130 and/or optical window 208. In addition, although cleaning device 204 and cleaning device 206 are shown separated by material dispenser 202, other arrangements may be possible (e.g., devices 204, 206 may be side by side).

Figure 4:
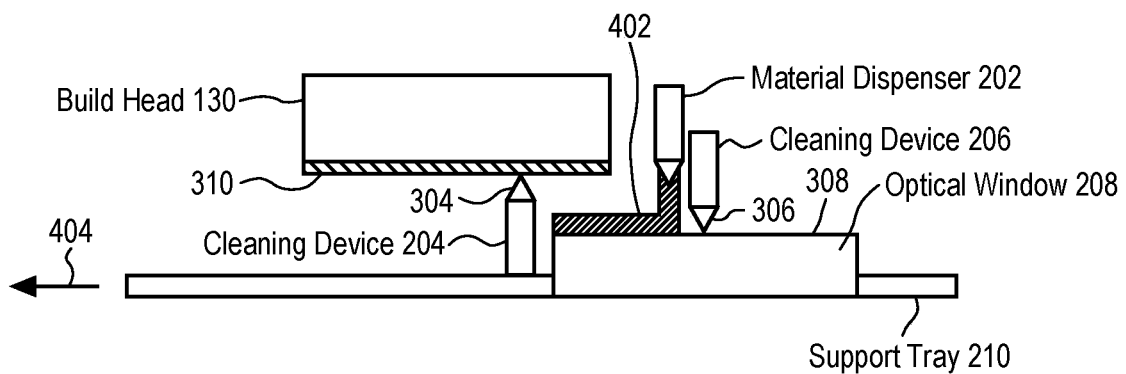
FIG. 4 shows a schematic diagram of the multi-material 3D printing system of FIG. 2 carrying out another printing operation.

FIG. 4 shows the printing operation of applying a first print material onto the optical window. In particular, first print material 402 is shown deposited onto the optical window 208 via material dispenser 202. Representatively, in one embodiment, support tray 210 moves relative to the material dispenser 202 as shown by arrow 404 to aid deposition of first print material 402 onto optical window 208. This movement is relative movement, and thus the moving piece can be the support tray 210, the material dispenser 202, or both, in various implementations. In addition, in some embodiments, this movement also causes cleaning device 204 and cleaning device 206 to slide along their respective cleaning surfaces as shown and simultaneously perform a cleaning operation. First print material 402 may be a relatively thin layer of material that is deposited in a controlled amount, and in some cases, only on the optical window portion of support tray 210.

Figure 5:
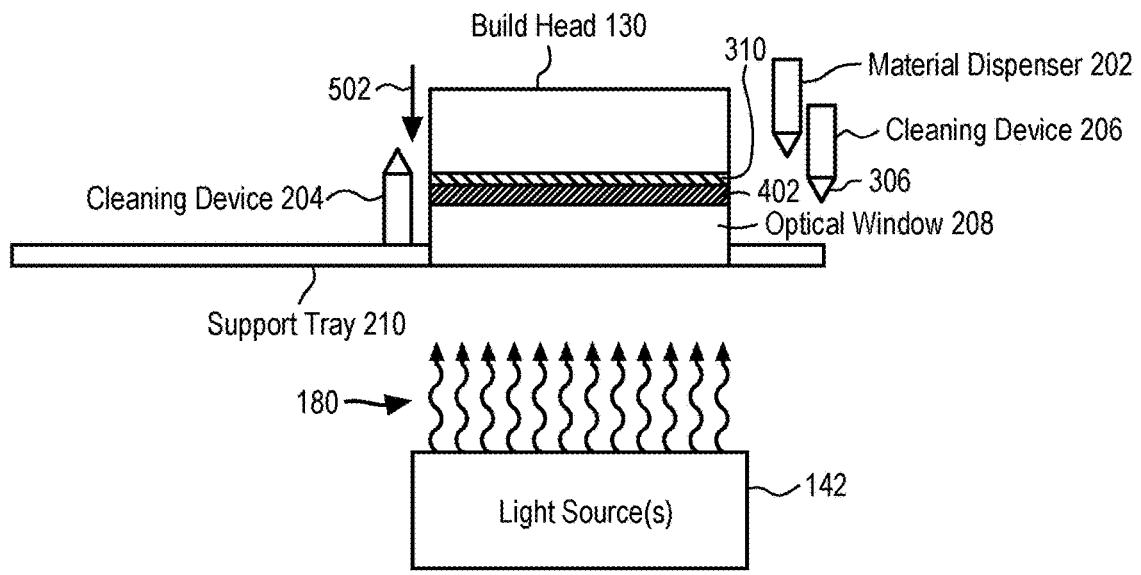
FIG. 5 shows a schematic diagram of the multi-material 3D printing system of FIG. 2 carrying out another printing operation.

FIG. 5 shows the printing operation of curing first material 402 onto build head 130. Representatively, build head 130 is shown positioned over optical window 208 and in contact with first material 402 that was deposited onto the optical window 208. This alignment may be achieved by continuing the previously discussed movement of support tray 210 relative to build head 130 in the horizontal or lateral direction as shown by arrow 404 (of FIG. 4) until build head 130 and window 208 are vertically aligned as shown. In addition, build head 130 and support tray 210 may be moved relative to one another in a vertical direction as shown by arrow 502 so that build head 130 contacts first material 402 positioned on optical window 208 when the two structures are aligned. The light source 142, positioned below optical window 208, then directs a light 180 into first material 402 through the optical window 208. In one embodiment, light source 142 is a laser source adapted to perform stereolithography. Light 180 may have a wavelength selected to cure material 402 in a defined pattern or patterns. This, in turn, cures first material 402 in the desired configuration to build head 130. In addition, the light source 142 can be a dual wavelength illumination source device or separate illumination devices.

Figure 6:
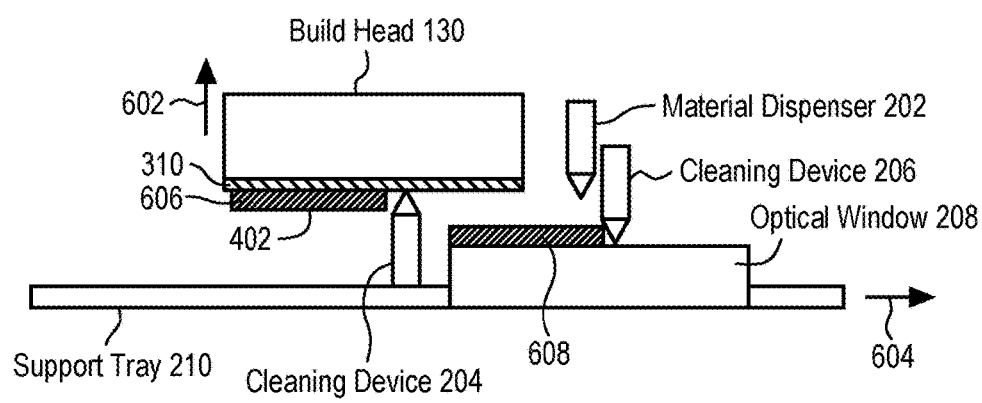
FIG. 6 shows a schematic diagram of the multi-material 3D printing system of FIG. 2 carrying out another printing operation.

FIG. 6 shows the further printing operation of separating support tray 210 from build head 130, onto which the cured first material 402 is attached. In particular, support tray 210 moves relative to the build head 130 in a direction of arrow 602. This movement is relative movement, and thus the moving piece can be the support tray 210 as shown, the build head 130, or both, in various implementations. During separation, cleaning device 204, which may be mounted to support tray 210 and faces build head 130, simultaneously cleans portions of build head 130 and the cured first material structure or layer 606 (e.g. cured layer consisting of first material 402) of any excess uncured first material 608, while the oppositely oriented cleaning device 206 cleans the optical window 208 of any excess uncured first material 608. For example, in one embodiment, after the operation shown in FIG. 5 is performed, build head 130 and support tray 210 may move relative to one another in a vertical direction as shown by arrow 602 so that build head 130 and support tray 210 are moved farther apart. This, in turn, allows for cleaning device 204 to slide past the portion of the cured first structure or layer 606 (and should remain) without contacting this portion. Once cleaning device 204 is aligned with the material to be removed (e.g., excess uncured material 608), build head 130 and support tray 210 can be moved closer together (e.g., a direction opposite arrow 602) so that the cleaning head of cleaning device 204 contacts the excess material 608. In this aspect, when the movement of support tray 210 in the direction of arrow 604 continues, cleaning device 204 removes excess material 608 from that point on. In addition, as cleaning device 204 is removing excess material 608 from build head 130, cleaning device 206, which is positioned to the right of excess material 608 (as shown in FIG. 6), removes excess material 608 from optical window 208 as excess material 608 slides past. It should be understood that because these operations (e.g., separation and cleaning) are performed simultaneously, the process time associated with printing multiple materials is significantly reduced. In addition, since the support tray 210 and window 208 are automatically cleaned by the system, a single support tray 210 having optical window 208, which does not need to be replaced by the user, can be used for multiple materials. In addition to further reducing processing time, this eliminates the need for multiple support trays (one for each material) and the challenges associated with ensuring the trays are coplanar to avoid distortions, thus resulting in a more precise printing system.

Figure 7A:
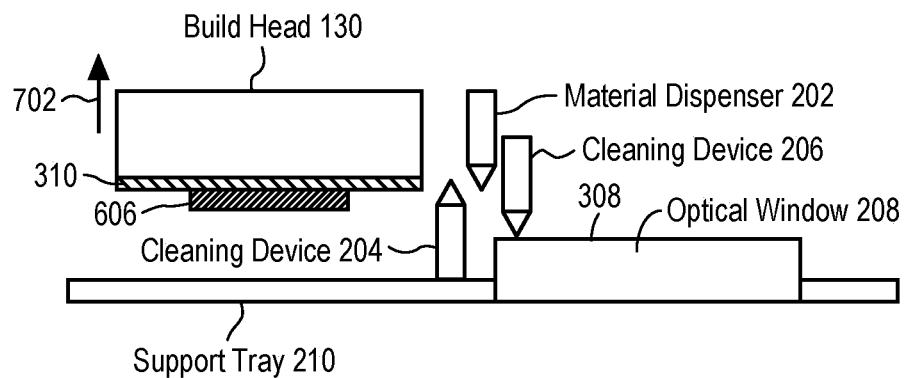
FIG. 7A shows a schematic diagram of the multi-material 3D printing system of FIG. 2 carrying out another printing operation.
Figure 7B:
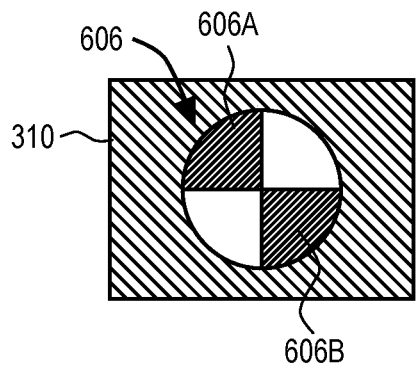
FIG. 7B shows a bottom plan view of a cured material layer after the printing operation of FIG. 7A.

FIG. 7A shows a subsequent printing operation in which first material structure or layer 606 is cured onto the build head 130 and optical window 208 is clean of any excess uncured material and ready for a subsequent printing material. In addition, as previously discussed, first material structure or layer 606 may be cured into a variety of shapes and/or patterns depending upon the 3D structure to be formed. Representatively, as can be seen from FIG. 7B, which is a bottom plan view of the cured first material structure or layer 606, the material may be cured onto build head 130 in a substantially hourglass or dual cone configuration having a first lobe 606A and a second lobe 606B. It should be understood, however, that because each of first lobe 606A and second lobe 606B are formed from the same material layer (e.g., layer of material 402), they will have substantially the same thickness (e.g. the thickness of the initial material layer). Once first material layer 606 is formed from first material 402, a second material layer may be formed, the processing operations of which are illustrated in FIG. 8 to FIG. 11.

Figure 8:
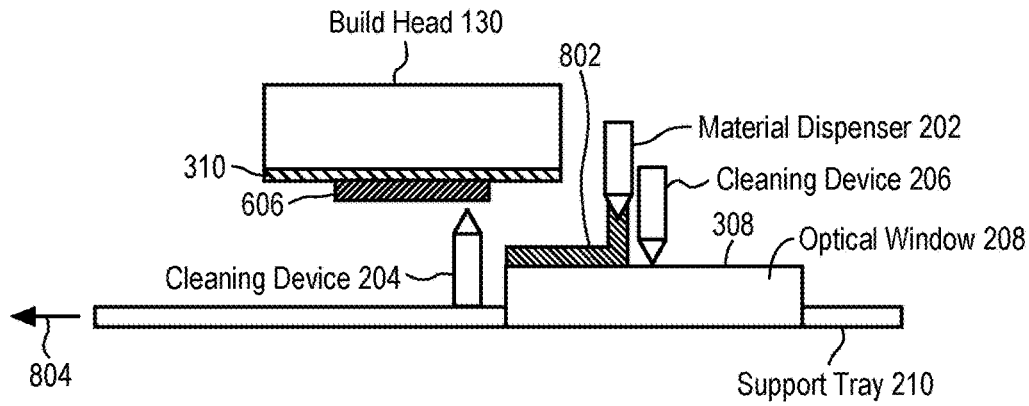
FIG. 8 shows a schematic diagram of the multi-material 3D printing system of FIG. 2 carrying out another printing operation.

In particular, FIG. 8 shows the deposition of a second material 802 onto the optical window 208 via material dispenser 202. Second printing material 802 may be a different material than printing material 402, or the same material in the case of, for example, a stacked deposition layer used to increase a thickness of the initial material layer. In addition, material dispenser 202 may be the same dispenser discussed in reference to FIG. 1 to FIG. 7B, or a different material dispenser. For example, in some embodiments, a separate dispenser may be used for each of the different materials. The support tray 210 moves relative to the material dispenser 202 to aid deposition of second material 802 onto the optical window 208. This movement is relative movement, and thus the moving piece can be the support tray 210 in a direction of arrow 804 as shown, the material dispenser 202, or both, in various implementations. The second material 802 may be deposited onto optical window 208 in a similar manner as previously discussed in reference to FIG. 4. In addition, support tray 210 may be moved in a direction of arrow 804 until second material is aligned with first material layer 606.

Figure 9:
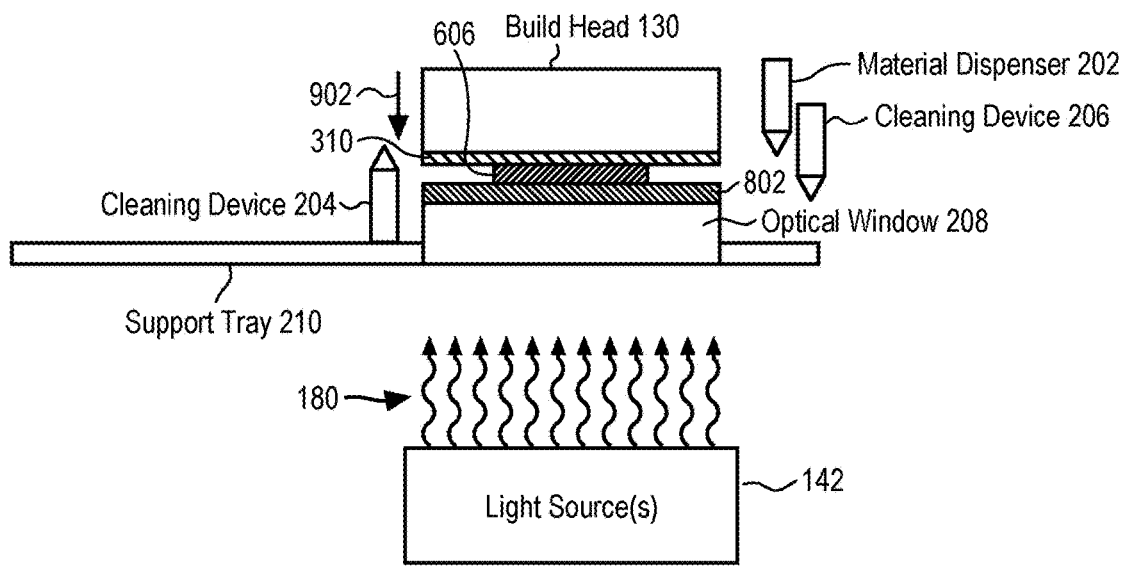
FIG. 9 shows a schematic diagram of the multi-material 3D printing system of FIG. 2 carrying out another printing operation.

Once aligned, build head 130 and support tray 210 may be moved closer together (e.g., build head 130 moved in a downward vertical direction as shown by arrow 902) so that first material layer 606 is in contact with uncured second material 802 that is deposited onto the optical window 208 as shown in FIG. 9. Second material 802 may be, for example, a layer on a surface of first material structure or layer 606 facing optical window 208 and/or surround portions of layer 606 to form a single layer on surface 310 of build head 130. The light source 142 then directs at least a first light 180 into second material 802 through the optical window 208. The light 180 has a wavelength selected to cure second material 802 in a defined pattern or patterns. In addition, the light source 142 can be a dual wavelength illumination source device or separate illumination devices.

Figure 10:
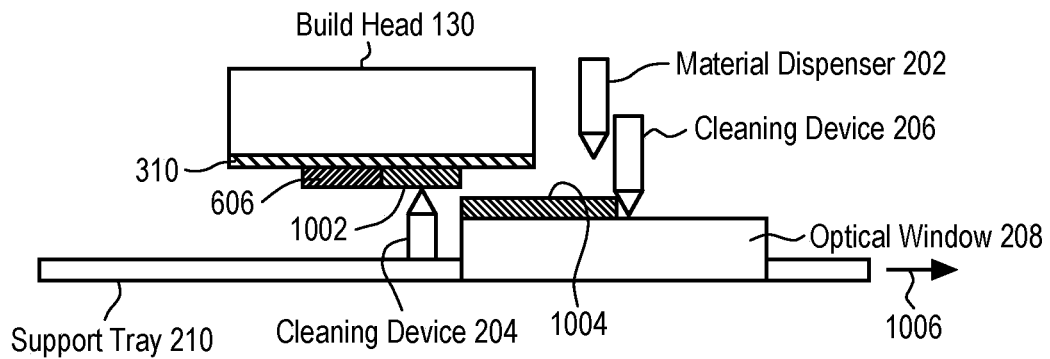
FIG. 10 shows a schematic diagram of the multi-material 3D printing system of FIG. 2 carrying out another printing operation.

Once cured, second material 802 forms a cured second material structure or layer 1002 on build head 130, in addition to the cured first material structure or layer 606, as shown in FIG. 10. Second material layer 1002 may be directly or indirectly attached to build head 130. In this embodiment, both layer 606 and layer 1002 are shown cured directly to surface 310 of build head 130 in a side-by-side manner (e.g. within a same layer). Once first and second material layers 606 and 1002, respectively, are formed, support tray 210 may be moved relative to build head 130 (e.g., moved in a direction of arrow 1006) and a cleaning operation is simultaneously performed to remove any excess, uncured second material. In particular, during separation, cleaning device 204 cleans build head 130 and the newly printed second material layer 1002 of any excess uncured second material 1004, while cleaning device 206 cleans the optical window 208 of any excess uncured second material 1004 as previously discussed in reference to FIG. 6.

Figure 11A:
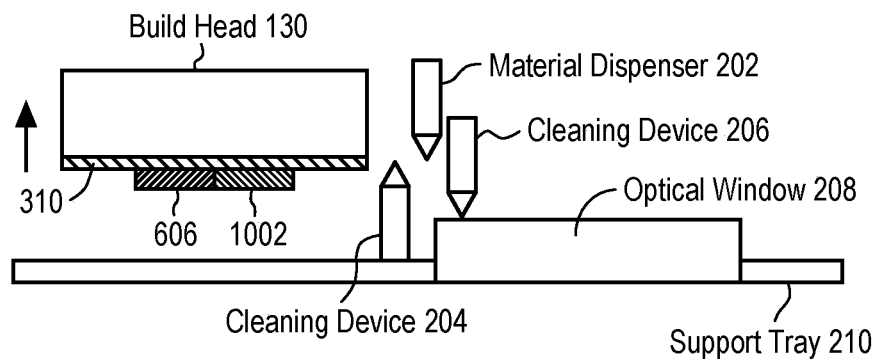
FIG. 11A shows a schematic diagram of the multi-material 3D printing system of FIG. 2 carrying out another printing operation.
Figure 11B:
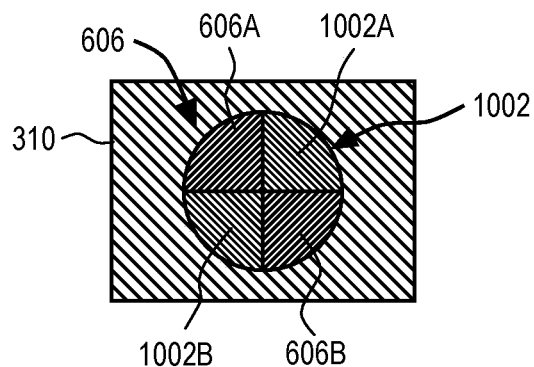
FIG. 11B shows a bottom plan view of a cured material layer after the printing operation of FIG. 11A.

FIG. 11A shows a subsequent printing operation in which all of the excess material is removed, first material layer 606 and second material layer 1002 are cured onto the build head 130 and optical window 208 is clean. As previously discussed, first material layer 606 may be cured into a variety of shapes and/or patterns depending upon the 3D structure to be formed. In addition, second material layer 1002 may be cured into a complimentary shape and/or pattern, or other shape or pattern that is different from layer 606. Representatively, as can be seen from FIG. 11B, which is a bottom plan view of the cured first material layer 606 and cured second material layer 1002, the first material may be cured onto build head 130 in a substantially hourglass or dual cone configuration having a first lobe 606A and a second lobe 606B, and the second material is cured into a similar shape which includes complementary first lobe 1002A and second lobe 1002B. It should be understood, however, that although first material layer 606 and second material layer 1002 are shown in the same plane (e.g., adjacent layers), one layer may be stacked on top of the other layer, or in any other configured desired to form a 3D structure out of multiple materials.

Figure 12:
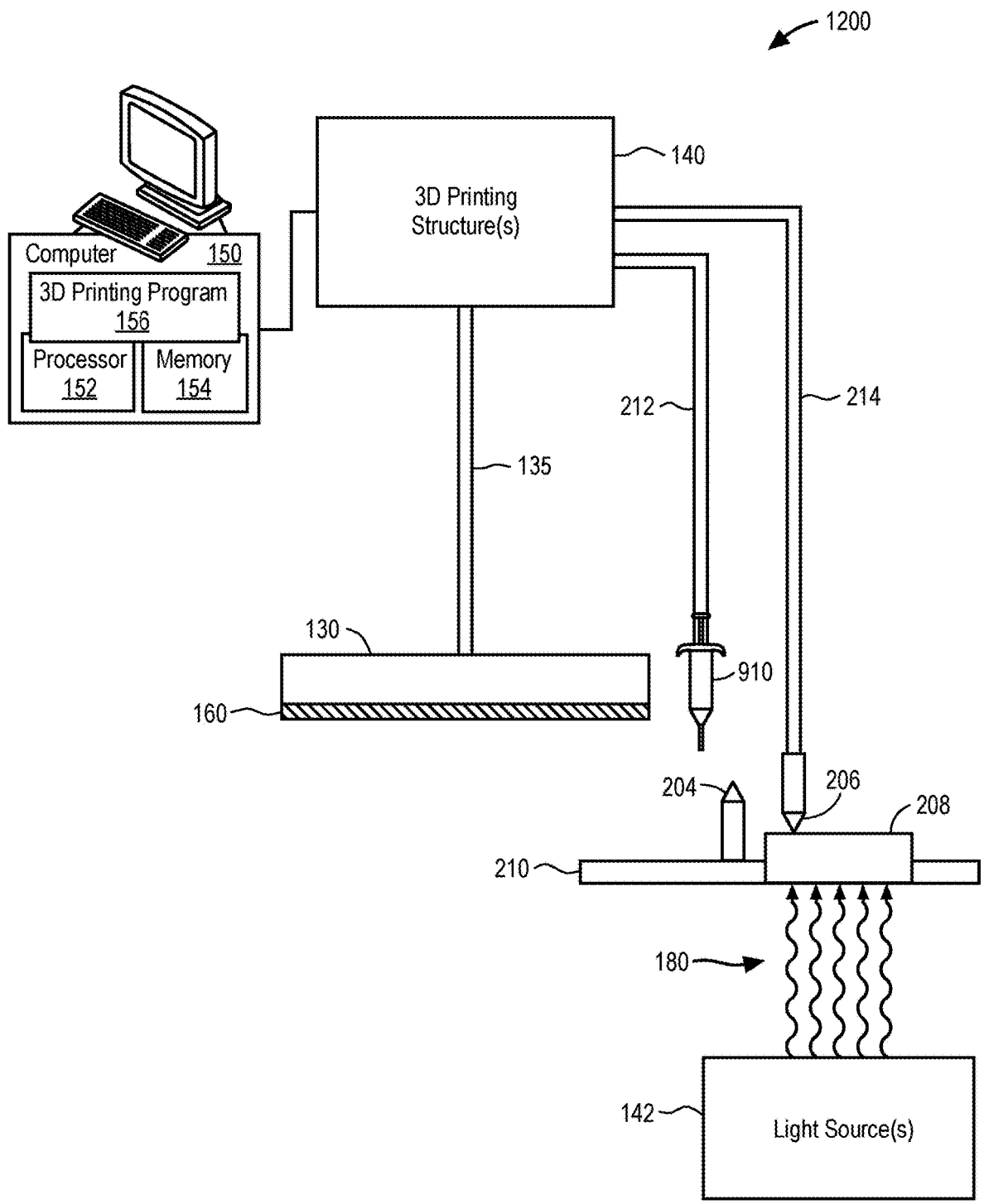
FIG. 12 shows a schematic diagram of another embodiment of a 3D printing system.

FIG. 12 shows a schematic diagram of another embodiment of a multi-material 3D printing system, which uses one or more syringes as dispensers of materials. 3D printing system 1200 shown in FIG. 12 may be substantially similar to system 200 shown in FIG. 2, except that the material dispenser may be substituted by one or more syringes 910. In FIG. 12 various aspects of the printing components are shown in more detail. In particular, from this view it can be seen that system 1200 includes a support tray 210, optical window 208, cleaning devices 204, 206, build plate 130 connected to rod 135, similar to the system illustrated in FIG. 2. System 1200 shown in FIG. 12 differs from system 200 shown in FIG. 2 in that material dispenser is syringe 910. This syringe may be connected to 3D printing structure(s) 140. In one embodiment, syringe 910 may be used as dispenser for dispensing more than one material, by reusing the same syringe to dispense one material at a time. In another embodiment, multiple syringes may be used, such that each syringe dispenses only one type of material to build a 3D printed structure.

FIGS. 2-12 show an example of a process for multi-material DLP SLA 3D printing using exemplary 3D printing systems. For example, the system may be a material deposition system that eliminates the cleaning and drying phases in multi-material DLP SLA 3D printing and can therefore significantly increase the print speed. In addition, the elimination of the use of multiple resin trays and the use of only one optical window can eliminate the issue of ensuring that multiple optical windows are co-planar and therefore reduce the complexity and cost of the system.

Figure 13:
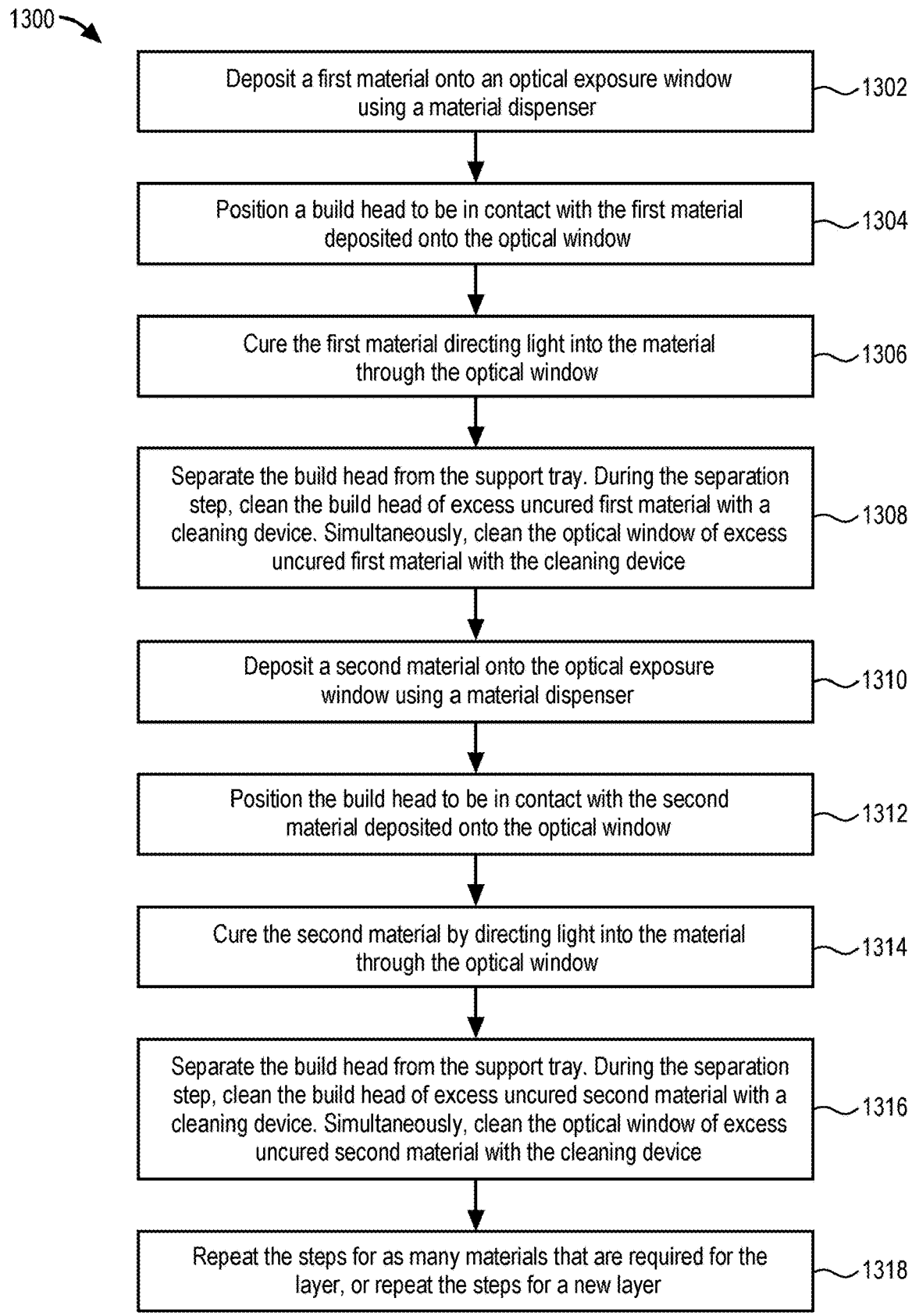
FIG. 13 shows a flow chart of one embodiment of a 3D printing process.

FIG. 13 illustrates one embodiment of a printing process using the previously discussed printing systems. Representatively, process 1300 may include depositing a first material (e.g., first material 402) onto an optical exposure window of a 3D printing system (e.g., optical exposure window 208 using a material dispenser 202) as shown in block 1302. As shown in block 1304, a build head (e.g., build head 130) may be positioned such that the clean build surface (e.g., clean build surface 310) of the build head is in contact with the first material deposited onto the optical exposure window. Block 1306 shows the operation of curing the first material onto the build head by directing a light (e.g., first light 180) into the first material through the optical exposure window.

As shown in block 1308, after curing the first material onto the build head, the build head is separated from a support tray (e.g., support tray 210). During separation of the build head from the support tray, the build head is cleaned of excess uncured first material (e.g., excess uncured first material 608) with a cleaning device (e.g., cleaning device 204). Simultaneously, the optical window is cleaned of excess uncured first material with a cleaning device (e.g., cleaning device 206). In one embodiment, the cleaning operation is coupled to the separation operation. As shown in block 1310, a second material (e.g., second material 802) is deposited onto the optical exposure window using a material dispenser. The material dispenser used to dispense the second material may be the same material dispenser described above or a different material dispenser. Block 1312 shows the operation of positioning the build head to be in contact with the second material deposited onto the optical exposure window. As shown in block 1314, the second material is cured by directing light into the second material through the optical exposure window. As shown in block 1316, the build head is separated from the support tray. During the separation operation, the build head is cleaned of excess uncured second material (e.g., excess uncured second material 1004) with a cleaning device (e.g., cleaning device 204). Simultaneously, the optical exposure window is cleaned of excess uncured second material with a cleaning device (e.g., cleaning device 206). In one embodiment, the cleaning operation is coupled to the separation operation. As shown in block 1318, the operations may be repeated for as many materials that are required for the layer, or the operations are repeated for a new layer.

Although a dispenser in general is disclosed herein for dispensing the material, it should be understood that the material can be deposited in many ways, for example, by a syringe pump (see FIG. 12), a peristaltic pump, an ink-jet head, roller transfer process or film transfer process.

The material can be bulk deposited or selectively deposited. In the case of bulk deposition, enough material is deposited to cover the whole area. In the case of selective deposition, material is only deposited where it will be cured. Selective deposition can be at a resolution greater than the XY resolution of the DLP as the cleaning devices will ensure that the excess material is removed. In addition, the cleaning devices can be passive cleaning devices such as blades, sponges, and/or brushes that can contain solvent. Further, a cleaning device can be an active cleaning device such as solvent sprays, mechanized brushes, or a combination thereof. In some implementations, only a single type of cleaning device is used in a 3D printer, and in other implementations, more than one type of cleaning device is used in a 3D printer.

In addition, it should be understood that in some embodiments, the 3D object printed using the 3D printing systems disclosed herein may be, or otherwise include, a self-supporting biocompatible structure (e.g., scaffold) to which biomaterials (e.g., cells) may later be added, or added simultaneously with the printing material. The structure may be removed after printing leaving behind a self-supporting biological structure. The term "scaffolding" as used herein may refer to any structure that is printed using a 3D printer. In some cases, the scaffolding or structure may be a temporary structure that is biologically compatible with any number of biomaterials such that it may be used as a support structure to which the biomaterials may be added and then grown into the desired biological structure. The scaffolding is then removed leaving behind a self-supporting three dimensional biological structure. In other cases, the scaffolding or structure is the final 3D printed object.

It should also be understood that the term "biological material" or "biomaterial" may refer to a biological material suitable for use in 3D printing technologies. For example, the material may be any biological material such as cells that can be printed with the aid of a computer controlled printing device to create a desired self-supporting biological structure. In some embodiments, a biomaterial includes cell solutions, cell aggregates, cell-comprising gels, proteins, multicellular bodies, or tissues. Representatively, in some embodiments, the biomaterial may include a plurality of cells, a component of extracellular matrix, a cellular material, a cellular component, a growth factor, a peptide, a protein, a synthetic molecule, or a combination thereof. In some embodiments, the cells may include cells derived from the endoderm. Representatively, the cells may include, but are not limited to, exocrine secretory epithelial cells, salivary gland cells (e.g., polysaccharide-rich secretion or glycoprotein enzyme-rich secretion), Von Ebner's gland cells, mammary gland cells, lacrimal gland cell, ceruminous gland cells, eccrine sweat gland cells, apocrine sweat gland cell, sebaceous gland cells, bowman's gland cells, brunner's gland cells, seminal vesicle cells, prostate gland cells, bulbourethral gland cell, bartholin's gland cell, uterus endometrium cell (carbohydrate secretion), isolated goblet cells of respiratory and digestive tracts, stomach lining mucous cell, gastric gland cells, pancreatic acinar cells, paneth cells, type II pneumocytes of lung, clara cells of the lung, hormone secreting cells, anterior pituitary cells, somatotropes, lactotropes, thyrotropes, gonadotropes, corticotropes, pituitary cells, magnocellular neurosecretory cells, gut and respiratory tract cells, thyroid gland cells, thyroid epithelial cell, parafollicular cell, parathyroid gland cells, parathyroid chief cell, oxyphil cell, adrenal gland cells, chromaffin cells, or kidney cells. In some embodiments, the cells may include cells derived from ectoderm. Representatively, the cells may include keratinizing epithelial cells, epidermal keratinocytes, epidermal basal cells (stem cell), keratinocytes of fingernails and toenails, nail bed basal cells, hair shaft cells, hair root sheath cells, hair matrix cells (stem cell), wet stratified barrier epithelial cells, surface epithelial cells, basal cells or urinary epithelium cells. In some embodiments, the cells may be nerve cells. Representative cells include, but are not limited to, sensory transducer cells, auditory inner hair cells, auditory outer hair cells, basal cells of olfactory epithelium, primary sensory neurons, merkel cells of epidermis, olfactory receptor neurons, sensory neurons, photoreceptor cells, autonomic neuron cells, cholinergic neural cell, adrenergic neural cells, peptidergic neural cells, sense organ and peripheral neuron supporting cells, cells of the organ of Corti, supporting cells (e.g. vestibular, taste bud, or olfactory epithelium), schwann cells, glial cells, astrocytes, or neuron cells. In some embodiments, the cells may be derived from the mesoderm. Representative cells may include, but are not limited to, metabolism and storage cells, hepatocytes, adipocytes, fat cells, liver lipocytes, kidney cells, pancreatic duct cells, exocrine gland striated duct cells, gall bladder epithelial cells, epididymal cells, extracellular matrix cells, epithelial cells, fibroblasts (e.g. connective tissue fibroblasts, tendon fibroblasts, bone marrow reticular tissue fibroblasts, or nonepithelial fibroblasts), hyaline cartilage chondrocyte, fibrocartilage chondrocyte, elastic cartilage chondrocyte, osteoblast/osteocytes, osteoprogenitor cell (stem cell of osteoblasts), hepatic stellate cell (Ito cell), pancreatic stellate cells, contractile cells, skeletal muscle cells, satellite cells, heart muscle cells, smooth muscle cells, myoepithelial cells, erythrocytes, megakaryocytes, monocytes, connective tissue macrophages, epidermal Langerhans cell, osteoclasts, dendritic cells, microglial cells, granulocytes, hybridoma cells, mast cells, T cells, B cells, reticulocytes, stem cells and committed progenitors for the blood and immune system, germ cells, oogonium/oocyte, spermatid, spermatocyte, spermatogonium cell (stem cell for spermatocyte), spermatozoon, follicle cells, thymus epithelial cells, or interstitial cells. The biomaterial may include one or a combination of any of the cells disclosed herein.

The term "self-supporting biological structure" may refer to any engineered tissue or organ that is viable and functional in the absence of a support structure or scaffolding. Representatively, the self-supporting biological structure may be a whole tissue, organ, or a portion thereof engineered to replicate wholly or in part its naturally occurring counterpart. Representative self-supporting biological structures may include, but are not limited to, connective tissues, muscle tissues, nervous system tissues, and epithelial tissues. Representative organs may include, but are not limited to, organ(s) associated with the cardiovascular system (e.g. heart), digestive system (e.g., esophagus, stomach, liver, gallbladder, pancreas, intestines, colon and rectum), the endocrine system (e.g., hypothalamus, pituitary gland, pineal body or pineal gland, thyroid, parathyroids and adrenals), the excretory system (e.g., kidneys, ureters, bladder and urethra), the immune system (e.g., bone marrow, thymus, spleen and lymph nodes), the integumentary system (e.g., skin, hair and nails), the muscular system (e.g., skeletal, smooth and cardiac muscles), the nervous system (e.g., brain and spinal cord), the reproductive system (e.g., ovaries, fallopian tubes, uterus, vagina, mammary glands, testes, vas deferens, seminal vesicles, prostate and penis), the respiratory system (e.g., pharynx, larynx, trachea, bronchi, lungs and diaphragm) and the skeletal system (e.g., bones, cartilage, ligaments and tendons).

In this aspect, in some cases, one or more of the 3D printing systems disclosed herein may be considered a "bioprinter." A bioprinter may be any computer operated printing device operable to print a structure that includes biomaterials. The bioprinter may include several components that allow the bioprinter to print the resin at various locations along a Cartesian coordinate system so that a three dimensional biological structure is created. The printed three dimensional biological structure may be considered an engineered three dimensional biological structure in that it is formed by a computer-aided device (e.g. a bioprinter) according to a set of computer-implemented instructions. Representatively, as previously discussed, the printer may include a controller that manages the operation of the print head according to a set of computer-implemented instructions (e.g. computer software, computer instructions, a computer program or a computer application).

In addition the mechanical structures described, embodiments of the subject matter and the functional operations described in this specification can be implemented using digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes described in this specification can be performed by, and/or under the control of, one or more programmable processors executing one or more computer programs to perform functions by operating on input data and generating output. The processes can also be performed by, and apparatus can also be implemented using, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

In addition, in some embodiments, the programmable processors may execute instructions contained in a machine-readable medium, that, when executed cause the computing device to perform the processes disclosed herein. For example, the set of instructions may include depositing a first material through a first material dispenser onto an optical exposure window of a stereolithographic three dimensional printer. The instructions may further include curing the first material onto a build head or a previously cured material layer on the build head. Further instructions may include cleaning the optical exposure window of any uncured first material, cleaning the build head or the previously cured material layer on the build head of any uncured first material, depositing a second material through a first material dispenser or a second material dispenser onto the optical exposure window, curing the second material onto the build head or the cured first material layer on the build head, cleaning the optical exposure window of any uncured second material, and cleaning the build head and the cured second material of any uncured second material. Further instructions may include separation of the build head from the optical exposure window after the curing step.

To provide for interaction with a user, embodiments of the subject matter described in this specification can be implemented using a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

It should also be appreciated that reference throughout this specification to "one embodiment", "an embodiment", or "one or more embodiments", for example, means that a particular feature may be included in the practice of the invention. Similarly, it should be appreciated that in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects may lie in less than all features of a single disclosed embodiment. Thus, the claims following the Detailed Description are hereby expressly incorporated into this Detailed Description, with each claim standing on its own as a separate embodiment of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A system for printing a three-dimensional (3D) object, comprising:
   a platform comprising a surface, wherein said surface is configured to hold (i) a first material layer comprising a first material or (ii) a second material layer comprising a second material;
   at least one dispenser configured to deposit said first material layer or said second material layer onto said surface;

an optical source configured to provide a light towards said surface, wherein said light is for solidifying at least a portion of said first material layer or at least a portion of said second material layer; and a processor operatively coupled to said at least one dispenser and said optical source, wherein said processor is programmed to:

(a) direct said at least one dispenser to deposit said first material layer over said surface;

(b) direct said optical source to provide said light towards said surface to solidify said at least said portion of said first material layer, to form a first material structure of said 3D object;

(c) subsequent to (b), direct said at least one dispenser to deposit said second material layer over said surface; and (d) direct said optical source to provide said light towards said surface to solidify said at least said portion of said second material layer, to form a second material structure of said 3D object, wherein, in (b), said surface is substantially free of a material different than said first material; and wherein, in (d), said surface is substantially free of a material different than said second material.

2. The system of claim 1, wherein said at least one dispenser is configured to deposit said first material layer or said second material layer onto only a portion of said platform that comprises said surface.

3. The system of claim 1, wherein said second material structure is formed adjacent to or over said first material structure.

4. The system of claim 3, wherein said second material structure is formed adjacent to and over said first material structure.

5. The system of claim 1, wherein said surface comprises a window.

6. The system of claim 5, wherein said optical source is configured to provide said light through said window and towards said at least said portion of said first material layer or said at least said portion of said second material layer.

7. The system of claim 5, wherein said optical source is positioned below said window.

8. The system of claim 1, further comprising a build head configured to hold said first material structure and said second material structure.

9. The system of claim 8, further comprising at least one cleaning device configured to clean (i) at least a portion of said surface, (ii) at least a portion of said first material structure, or (iii) a surface of said build head.

10. The system of claim 9, wherein said processor is further configured to direct, prior to (c), said at least one cleaning device to clean (i), (ii), or (iii).

11. The system of claim 10, wherein said processor is configured to direct said at least one cleaning device to clean (i).

12. The system of claim 10, wherein said processor is configured to direct said at least one cleaning device to clean (ii).

13. The system of claim 10, wherein said processor is configured to direct said at least one cleaning device to clean (iii).

14. The system of claim 9, wherein said processor is further configured to direct a relative movement between said at least one cleaning device and said surface of said platform.

15. The system of claim 9, wherein said processor is further configured to direct a relative movement between said at least one cleaning device and said build head.

16. The system of claim 9, wherein said processor is further configured to simultaneously direct (1) said at least one cleaning device to clean (i), (ii), or (iii) and (2) said at least one dispenser to deposit said second material layer over said surface.

17. The system of claim 9, wherein said at least one cleaning device comprises a blade, a sponge, a brush, or a solvent spray.

18. The system of claim 8, wherein said processor is further configured to direct a relative movement between said build head and said surface.

19. The system of claim 1, wherein said first material or said second material comprises (i) a polymeric precursor and (ii) and a photoinitiator.

20. The system of claim 1, wherein said first material and said second material are different.

* * * * *